United States Patent
Park et al.

(10) Patent No.: US 10,573,308 B2
(45) Date of Patent: Feb. 25, 2020

(54) APPARATUS AND METHOD FOR DETERMINING OPERATION BASED ON CONTEXT, VEHICLE FOR DETERMINING OPERATION BASED ON CONTEXT, AND METHOD OF CONTROLLING THE VEHICLE

(71) Applicants: Hyundai Motor Company, Seoul (KR); Kia Motors Corporation, Seoul (KR)

(72) Inventors: Sung Soo Park, Seoul (KR); Seong Soo Yae, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 221 days.

(21) Appl. No.: 15/804,594

(22) Filed: Nov. 6, 2017

(65) Prior Publication Data

US 2018/0350364 A1    Dec. 6, 2018

(30) Foreign Application Priority Data

Jun. 2, 2017   (KR) .................... 10-2017-0068858

(51) Int. Cl.
*G06F 17/27*    (2006.01)
*G10L 15/22*    (2006.01)
(Continued)

(52) U.S. Cl.
CPC .............. *G10L 15/22* (2013.01); *B60K 35/00* (2013.01); *B60K 37/06* (2013.01); *G06F 3/167* (2013.01);
(Continued)

(58) Field of Classification Search
CPC .......... G06F 16/9535; G06F 16/24575; G06F 16/3322; G06F 16/435; G06F 16/90324; G06F 17/2785; G06F 3/167; G06F 16/3329; G06F 17/2765; G06F 9/453; G06F 16/29; G06F 16/3344; G06F 16/437; G06F 3/04812; G06F 16/00; G06F 16/2465;
(Continued)

(56) References Cited

U.S. PATENT DOCUMENTS

2012/0317106 A1*  12/2012  Akiyama .............. G06F 16/907
                                                    707/730
2015/0088689 A1*  3/2015  de Castro Leao Monteiro ...........
                                                    G06Q 30/0625
                                                    705/26.43
(Continued)

*Primary Examiner* — Huyen X Vo
(74) *Attorney, Agent, or Firm* — Mintz Levin Cohn Ferris Glovsky and Popeo, P.C.; Peter F. Corless

(57) ABSTRACT

A context-based operation determination apparatus includes a context information obtainer configured to obtain context information; a context awareness database constructed using data related to a previously performed action; a processor configured to determine a recommendation index that corresponds to a recommended operation and the recommended operation using the context information, and data obtained from the context awareness database; and a selection history database constructed using the final operation, the recommendation index, and an actual operation in a state where the final operation is presented, where the processor verifies the recommended operation using the selection history database.

27 Claims, 14 Drawing Sheets

(51) Int. Cl.
*B60K 35/00* (2006.01)
*G10L 15/26* (2006.01)
*G06F 3/16* (2006.01)
*B60K 37/06* (2006.01)

(52) U.S. Cl.
CPC ........ *G10L 15/26* (2013.01); *B60K 2370/148* (2019.05); *B60K 2370/741* (2019.05); *G10L 2015/223* (2013.01)

(58) Field of Classification Search
CPC ............... G06F 16/9024; G06F 16/337; G06F 21/6245; G06F 16/258; G06F 16/283; G06F 3/0487; G06F 11/3438; G06F 11/3452; G06F 11/3476; G06F 16/3323
See application file for complete search history.

(56) References Cited

U.S. PATENT DOCUMENTS

| | | | |
|---|---|---|---|
| 2015/0222576 A1* | 8/2015 | Anderson | G06F 3/04817 715/752 |
| 2016/0259775 A1* | 9/2016 | Gelfenbeyn | G06F 17/279 |
| 2017/0011136 A1* | 1/2017 | Gabbai | G06F 16/26 |

* cited by examiner

FIG. 5

| | INDEX | CALL DESTINATION | CALL MEANS | DATE | TIME | CALL LOCATION | ... |
|---|---|---|---|---|---|---|---|
| | f0 | f11 | f12 | f13 | f14 | f15 | |
| R11 | 1 | GIL-DONG, HONG | MOBILE PHONE | 2016/06/21 | 18:30 | AROUND COMPANY | ... |
| R12 | 2 | WIFE | HOME PHONE | 2016/06/21 | 20:19 | AROUND HOME | ... |
| R13 | 3 | MR. KIM | OFFICE PHONE | 2016/06/09 | 07:34 | AROUND CITY HALL | ... |
| | ⋮ | ⋮ | ⋮ | ⋮ | ⋮ | ⋮ | ⋮ |

| # | POI | ADDRESS | SEARCHING DEVICE | DATE OF SEARCHING | TIME OF SEARCHING | LOCATION OF SEARCHING (GPS) | ADDITIONAL INFORMATION OF POI |
|---|---|---|---|---|---|---|---|
| 1 | LAKE PARK | GOYANG-SI, GYEONGI-DO | SERVER | SATURDAY | 6/22 11:12 | (37.5, 128.0) | ... |
| 2 | DEPARTMENT STORE | GANGNAM-GU, SEOUL | SERVER | SUNDAY | 6/12 19:20 | (37.5, 127.5) | ... |
| ... | ... | ... | ... | ... | ... | ... | ... |

FIG. 8

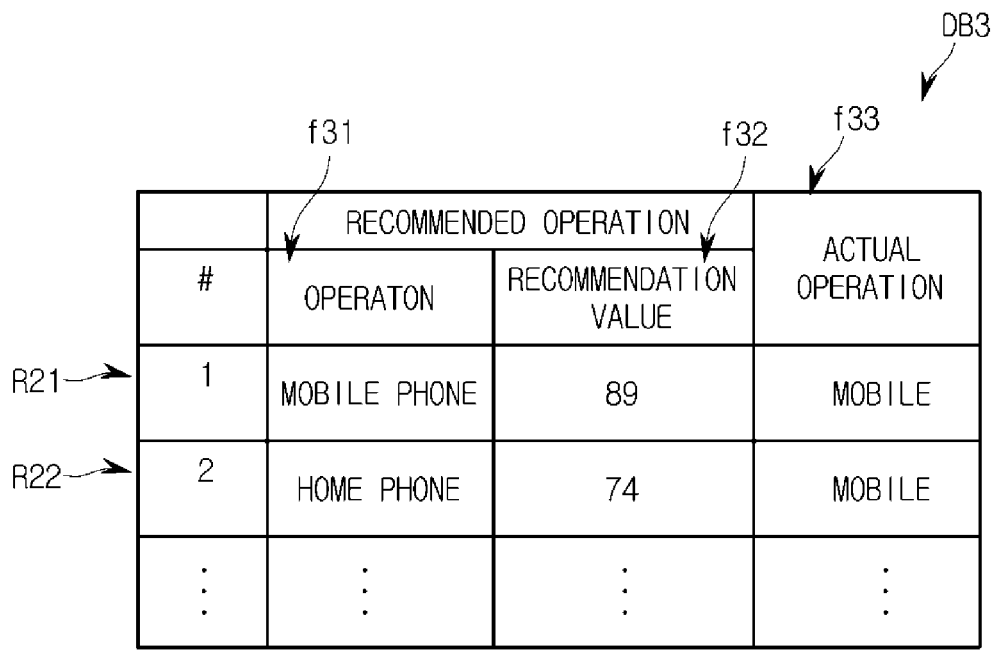

| # | RECOMMENDED OPERATION | | ACTUAL OPERATION |
|---|---|---|---|
| | OPERATON (f31) | RECOMMENDATION VALUE (f32) | (f33) |
| 1 (R21) | MOBILE PHONE | 89 | MOBILE |
| 2 (R22) | HOME PHONE | 74 | MOBILE |
| ⋮ | ⋮ | ⋮ | ⋮ |

| # | RECOMMENDED OPERATION (f41) | | ACTUAL OPERATION (f43) |
|---|---|---|---|
| | OPERATON | RECOMMENDATION VALUE (f42) | |
| 1 (R23) | LAKE PARK | 95 | LAKE PARK |
| 2 (R24) | FIRST THEATRE | 54 | SECOND THEATRE |
| ⋮ | ⋮ | ⋮ | ⋮ |

DB4 ately to a user in accordance with a user's input.

APPARATUS AND METHOD FOR DETERMINING OPERATION BASED ON CONTEXT, VEHICLE FOR DETERMINING OPERATION BASED ON CONTEXT, AND METHOD OF CONTROLLING THE VEHICLE

CROSS-REFERENCE TO RELATED APPLICATION(S)

This application claims under 35 U.S.C. § 119(a) the benefit of Korean Patent Application No. 10-2017-0068858, filed on Jun. 2, 2017 in the Korean Intellectual Property Office, the entire contents of which are incorporated herein by reference.

BACKGROUND

1. Technical Field

Embodiments of the present disclosure relate to a context-based operation determination apparatus, a vehicle capable of determining an operation based on a context, a method of determining an operation based on a context, and a method of controlling the vehicle.

2. Description of the Related Art

A vehicle may be defined as an apparatus capable of moving to a destination while driving on a road or track. Usually, the vehicle is provided so as to be movable by rotational driving of at least one wheel installed on the vehicle body. The vehicle may include, for example, a three-wheeled vehicle, a four-wheeled vehicle, a two-wheeled vehicle such as a motorcycle, a piece of construction equipment, a bicycle or a train traveling on a railway arranged on a railway line.

In recent years, for the convenience of the user and the pleasure of driving, various devices have been installed inside the vehicle. For example, a device for recognizing a voice according to a user's command and performing various operations such as a telephone call or a search of a destination in response to the recognized voice may be installed inside the vehicle. Such a device may include, for example, a terminal device such as a smart phone, an instrument panel, a navigation device, a head unit, etc.

SUMMARY

It is an aspect of the present disclosure to provide a context-based operation determination apparatus, a vehicle capable of determining an operation based on a context, a method of determining an operation based on a context and a method of controlling the vehicle that are capable of providing a recommended operation more quickly and appropri It is another aspect of the present disclosure to provide a context-based operation determination apparatus, a vehicle capable of determining an operation based on a context, a method of determining an operation based on a context, and a method of controlling the vehicle that may improve the quality of command recognition and action recommendation by omitting unnecessary and additional input of a command or conversation with the user.

A context-based operation determination apparatus may include a context information obtainer configured to obtain context information, a context awareness database constructed using data related to a previously performed action, a processor configured to determine a recommendation index that corresponds to a recommended operation and the recommended operation using the context information and data obtained from the context awareness database, to verify the recommended operation and to determine a final operation according to a result of verification and selection history database constructed using the final operation, the recommendation index and an actual operation in a state where the final operation is presented, wherein the processor verifies the recommended operation using the selection history database.

The context information may include a current time and a current position.

The processor may be further configured to determine a selection pattern for each analysis criteria using the context information and data obtained from the context awareness database and to determine the recommended operation and the recommendation index using the selection pattern.

The processor may be further configured to generate a first result value regarding at least one operation for each position, to generate a second result value regarding at least one operation for each time and to generate a third result value regarding at least one operation for an entire operation so as to determine the selection pattern.

The processor may be further configured to obtain an analysis result for at least one operation by performing a sum of the first result value, the second result value and the third result value or by performing a weighted sum of the first result value, the second result value and the third result value.

The processor may be further configured to determine the recommended operation and the recommendation index by comparing the analysis result for the at least one operation.

The processor may be further configured to determine a plurality of weights using the selection history database and to obtain a verification result value by performing the weighted sum of the recommended operation and the recommendation index based on the plurality of weights.

The processor may be further configured to compare the verification result value with a reference value and to determine the recommended operation as the final operation based on a result of the comparison.

The processor may be further configured to generate a control signal that corresponds to the final operation in response to the determination of the final operation.

The context-based operation determination apparatus may further include a user interface configured to provide a user with a query about whether the final operation is approved.

The user interface may be further configured to provide a user with a query about whether the final operation is approved after the final operation is generated.

The processor may be further configured to maintain the final operation when the user interface receives a command of whether the final operation is approved, and to stop the final operation when the user interface receives a command of whether the final operation is not approved.

The processor may be further configured to update the selection history database in response to receiving at least one of the commands of whether the final operation is approved and whether the final operation is not approved.

The processor may be further configured to generate a control signal to perform a predefined operation when the recommended operation is improper as a result of verification of the recommended operation.

A method of determining an operation based on a context may include obtaining context information, obtaining data from a context awareness database constructed by data related to a previously performed action, determining a recommendation index that corresponds to a recommended operation and a recommended operation based on the context information and data obtained from the context awareness database, verifying the recommended operation and determining a final operation based on a result of verification, wherein the verifying the recommended operation may include verifying the recommended operation using a selection history database constructed using the final operation, the recommendation index and an actual operation in a state where the final operation is presented.

The context information includes a current time and a current position.

Determining a recommendation index that corresponds to a recommended operation and a recommended operation based on the context information and data obtained from the context awareness database, may include determining a selection pattern for each analysis criteria using the context information and data obtained from the context awareness database and determining the recommended operation and the recommendation index using the selection pattern.

Determining the selection pattern for each analysis criteria using the context information and data obtained from the context awareness database, may include generating a first result value regarding at least one operation for each position, generating a second result value regarding at least one operation for each time and generating a third result value regarding at least one operation for an entire operation so as to determine the selection pattern.

Determining the recommended operation and the recommendation index using the selection pattern, may include obtaining an analysis result for at least one operation by performing a sum of the first result value, the second result value and the third result value or obtaining an analysis result for at least one operation by performing a weighted sum of the first result value, the second result value and the third result value.

Determining the recommended operation and the recommendation index using the selection pattern, may include determining the recommended operation and the recommendation index by comparing the analysis result for the at least one operation.

Verifying the recommended operation using a selection history database constructed using the final operation, the recommendation index and an actual operation in a state where the final operation is presented, may include determining a plurality of weights using the selection history database and obtaining a verification result value by performing the weighted sum of the recommended operation and the recommendation index based on the plurality of weights.

Verifying the recommended operation using a selection history database constructed using the final operation, the recommendation index and an actual operation in a state where the final operation is presented, may include comparing the verification result value with a reference value and determining the recommended operation as the final operation based on a result of the comparison.

The method may further include starting the final operation in response to the determination of the final operation.

The method may further include providing a user with a query about whether the final operation is approved.

The method may further include at least one of maintaining the final operation when the user interface receives a command of whether the final operation is approved and stopping the final operation when the user interface receives a command of whether the final operation is not approved.

The method may further include updating the selection history database in response to receiving at least one of the commands of whether the final operation is approved or whether the final operation is not approved.

The method may further include performing a predefined operation when the recommended operation is improper as a result of verification of the recommended operation.

A vehicle may include a context information obtainer configured to obtain context information, a context awareness database constructed using data related to a previously performed action, a processor configured to determine a recommendation index that corresponds to a recommended operation and the recommended operation using the context information and data obtained from the context awareness database, to verify the recommended operation and to determine a final operation according to a result of verification and selection history database constructed using the final operation, the recommendation index and an actual operation in a state where the final operation is presented, wherein the processor verifies the recommended operation using the selection history database.

A method of controlling a vehicle may include obtaining context information, obtaining data from a context awareness database constructed by data related to a previously performed action, determining a recommendation index that corresponds to a recommended operation and a recommended operation based on the context information and data obtained from the context awareness database, verifying the recommended operation and determining a final operation based on a result of verification, wherein the verifying the recommended operation may include verifying the recommended operation using a selection history database constructed using the final operation, the recommendation index and an actual operation in a state where the final operation is presented.

BRIEF DESCRIPTION OF THE DRAWINGS

These and/or other aspects of the disclosure will become apparent and more readily appreciated from the following description of the embodiments, taken in conjunction with the accompanying drawings.

FIG. 5 is a view illustrating a context awareness database corresponding to a telephone generation operation as an example of a context awareness database.

FIG. 6 is a view illustrating an example of a context awareness database corresponding to a destination search operation as another example of a context awareness database.

FIG. 8 is a view illustrating an example of a usage history database related to a telephone generation operation in one embodiment of a selection history database.

FIG. 9 is a view illustrating an example of a usage history database related to a destination search in one embodiment of a selection history database.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

One or more embodiments of the context-based operation determination apparatus is described referring to FIGS. 1-12.

Figure 1:
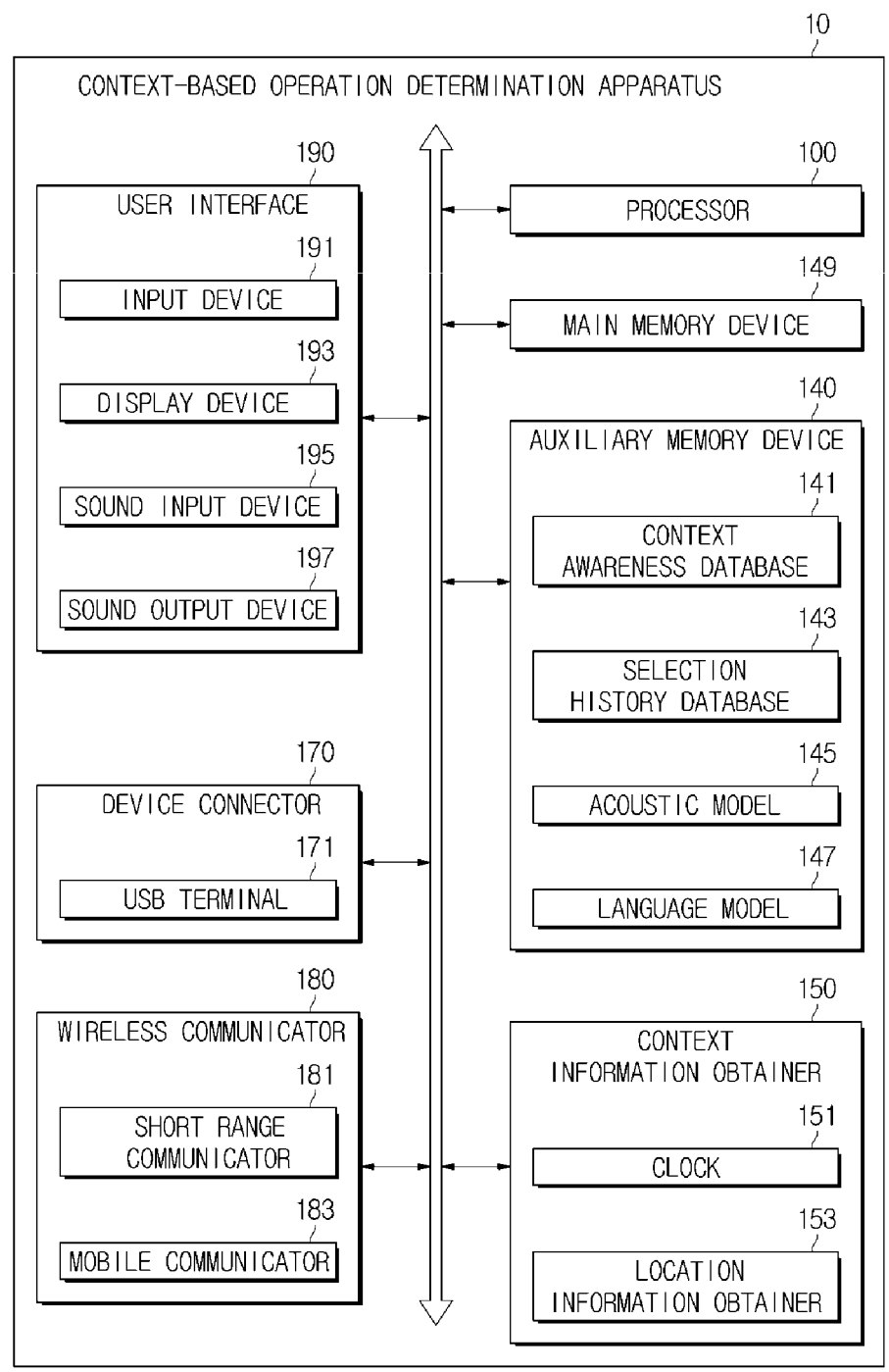
FIG. 1 is a block diagram of one embodiment of a context-based operation determination apparatus.

FIG. 1 is a block diagram of one embodiment of a context-based operation determination apparatus.

A context-based operation determination apparatus 10 is a device that predicts an operation desired by a user based on a context, and thereafter performs an operation according to a predicted operation or provides a predicted operation to the user as a recommended operation.

For example, the context-based operation determination apparatus 10 may be implemented using one or more devices that may receive commands from the user using at least one input means, and may predict and determine an operation by comparing and analyzing data based on the input command.

For example, the context-based operation determination apparatus 10 may include at least one of a cellular phone, a smart phone, a tablet PC, a desktop computer, a laptop computer, a navigation device, a home game machine, a portable game machine, a personal digital assistant (PDA) and wearable devices such as smart glasses, smart rings, smart watches, etc. The context-based operation determination apparatus 10 may also include a vehicle, a mechanical device, a robot or home appliances such as a robot cleaner, a television, a refrigerator, a washing machine, etc. In addition, one or more devices that a designer may consider are an example of the context-based operation determination apparatus 10.

According to FIG. 1, the context-based operation determination apparatus 10 may include a processor 100, an auxiliary memory device 140, a main memory device 149, a context information obtainer 150, and a user interface 190

The processor 100 may be provided to perform various calculations and processes necessary for the operation of the context-based operation determination apparatus 10, and to transmit a control signal to each of the components of the context-based operation determination apparatus 10 in order to control the overall operation of context-based operation determination apparatus 10.

According to an embodiment, the processor 100 may include at least one of a Central Processing Unit (CPU), a Micro Controller Unit (MCU), an Application Processor (AP), and an Electronic Control Unit (ECU). The CPU, the MCU, the AP, and/or the ECU may be implemented using at least one of a semiconductor chip, a substrate and/or a part related to them.

The processor 100 may be provided to be pre-programmed separately to perform a specific operation. Also, the processor 100 may be provided to be able to perform a specific operation by executing a predetermined algorithm and/or a program product including the predetermined algorithm stored in the main memory device 149 or the auxiliary memory device 140. In particular, the program product may be referred to as an application, for example. According to one embodiment, the application may be transmitted from an external application providing server apparatus.

According to one embodiment, the processor 100 may extract speech portions from sounds input through a sound input device 195 and perform speech recognition using the speech portions. Accordingly, the user may input a voice command to the context-based operation determination apparatus 10 using a voice (or speech).

Also, according to one embodiment, the processor 100 may predict and determine a predetermined operation in response to the user's command and control the context-based operation determination apparatus 10 to operate according to the predicted and determined operation. For example, the processor 100 may be configured to determine a recommended operation based on a context awareness database 141 and context information collected by the context information obtainer 150, to verify the determined recommended operation by using a selection history database 143, and to determine the final operation for the context-based operation determination apparatus 10 based on the verification result.

According to one embodiment, the processor 100 may further be configured to present a determined final operation to the user as a recommended operation, or to perform a calculation and/or process or control each part so that the context-based operation determination apparatus 10 operates according to a final operation without presenting the recommended operation.

Detailed operations of the processor 100 will be described later.

The auxiliary memory device 140 may store various information necessary for operation of the context-based operation determination apparatus 10 temporarily or permanently.

For example, the auxiliary memory device 140 may store at least one of the context awareness database 141 and the selection history database 143. The context awareness database 141 may be used by the processor 100 for the generation of a recommended operation, and the selection history database 143 may be used by the processor 100 for verification of a recommended operation. All or some of the records constructed in at least one of the context awareness database 141 and the selection history database 143 may be transmitted to the processor 100 in the form of an electrical signal in response to a request for retrieval of the processor 100. The details of the context awareness database 141 and the selection history database 143 will be described later.

In addition, the auxiliary memory device 140 may further store an acoustic model 145 or a language model 147, as needed. The acoustic model 145 or the language model 147 may be used for a language recognition operation of the processor 100.

Further, the auxiliary memory device 140 may store all or a portion of an algorithm related to the operation of the processor 100. For example, the auxiliary memory device 140 may store all or a portion of the algorithm in the form of a program.

The auxiliary memory device 140 may be implemented using at least one storage medium capable of storing data permanently or semi-permanently, which may include a flash memory device, a Secure Digital (SD) card, a solid state drive (SSD), a hard disk drive (HDD), a magnetic drum, a magnetic tape, a magneto-optical disk and/or a floppy disk, or the like, for example.

The main memory device 149 may temporarily or permanently store at least one of data, an algorithm, and a program product necessary for the operation of the processor 100. For example, the main memory device 149 may temporarily or permanently store an algorithm or a program for operation of the processor 100 retrieved from the auxiliary memory device 140 so that the processor 100 may perform a necessary operation (or operations) more quickly.

The main memory device 149 may be designed to store at least one of the context awareness database 141 and the selection history database 143 temporarily or permanently as needed.

The main memory device 149 may be implemented using a semiconductor storage medium such as ROM and/or RAM. The ROM may include, for example, conventional ROM, EPROM, EEPROM and/or MASK-ROMs, etc. The RAM may include, for example, DRAM and/or SRAM.

The context information obtainer 150 is provided to collect information necessary for the operation of the context-based operation determination apparatus 10.

According to one embodiment, the context information obtainer 150 may include at least one of a clock 151 and a location information obtainer 153.

The clock 151 may acquire the current time. The acquired time may be transferred to at least one of the processor 100 and the auxiliary memory device 140 in the form of an electrical signal.

The location information obtainer 153 may be configured to receive, measure or determine information of the current position of the context-based operation determination apparatus 10 (hereinafter a position information) and to transmit the received, measured or determined position information to the processor 100. The location information may include for example, latitude and longitude, GPS (Global Positioning System) coordinates, an address or a road name determined using coordinates of the current location, a specific location name determined using coordinates of the current location, etc. The specific location name may be defined by the user, and for example, may include one or more word such as a home or a company.

The location information obtainer 153 may obtain location information using, for example, a Global Navigation Satellite System (GNSS). In particular, the global navigation satellite system may include at least one of various navigation systems capable of calculating the position of a receiving terminal using a radio wave signal received from a satellite. For example, the global navigation satellite system may be implemented in a variety of navigation systems including, but not limited to, GPS, Galileo, Global Orbiting Navigational Satellite System (GLONASS), COMPASS, Indian Regional Navigational Satellite System (IRNSS), or a navigation system such as a Quasi-Zenith Satellite System (QZSS).

According to one embodiment, the context information obtainer 150 may further include various devices capable of acquiring information on the surrounding context in addition to the clock 151 and the location information obtainer 153. For example, the context information obtainer 150 may include at least one of a light sensor capable of sensing a light amount, a heartbeat detection sensor capable of sensing the user's heartbeat, a noise sensor capable of measuring ambient noise, a thermometer capable of measuring a body temperature of the user, and other various context information collectors that may be considered by a designer.

At least one of the context information obtained from the context information obtainer 150, e.g., at least one of information on time, position, amount of light, heart rate of the user, size of the noise, body temperature or the like, may be transmitted to the processor 100. The processor 100 may use one or more of the received context information to determine a recommended operation corresponding to the context.

The user interface 190 is configured to receive at least one command from the user and/or to provide various information to the user visually or audibly.

The user interface 190 may be installed directly on the context-based operation determination apparatus 10 according to the embodiment, or may be implemented using a device provided separately from the context-based operation determination apparatus 10. When the user interface 190 is provided separately from the context-based operation determination apparatus 10, the user interface 190 may be configured to communicate with the context-based operation determination apparatus 10 via a cable or a predetermined wireless communication network.

According to one embodiment, the user interface 190 may include at least one of a display device 193, an input device 191, the sound input device 195, and a sound output device 197. At least one of the display device 193, the input device 191, the sound input device 195 and the sound output device 197 may be omitted depending on the designer's choice.

The display device 193 may provide at least one piece of information to the user visually using various numbers, symbols, characters, figures and/or shapes. At least one piece of information may be related to the operation or state of the context-based operation determination apparatus 10. For example, the display device 193 may display the information regarding whether to perform a recommended operation or a final operation according to the processing result of the processor 100 and provide the information to the user.

For example, the display device 193 may be implemented using a Plasma Display Panel (PDP), a Light Emitting Diode (LED) display panel or a Liquid Crystal Display (LCD). Herein, the LED display panel may include an Organic Light Emitting Diode (OLED) and the like, and the OLED may include a Passive Matrix OLED (PMOLED) or an Active Matrix OLED (AMOLED).

The input device 191 may be configured to receive commands or data from the user. For example, the input device 191 may receive an indication regarding whether to select the recommended operation indicated by the display device 193 or an indication regarding whether to approve the final operation performed by the context from the user.

The input device 191 may include a physical button, a knob, a trackball, a trackpad, a touch pad, a touch screen, a joystick, and/or a motion detection sensor, etc. Herein, the touch screen may perform all of the functions of the display device 193 and the input device 191. Additionally, at least one of various input devices that may be considered by a designer for inputting data or commands may be employed as the input device 191 described above.

The sound input device 195 may be configured to receive sound waves from the outside, to convert the received sound waves into an electrical signal, and to output an electrical signal corresponding to the received sound waves. The sound waves received by the sound input device 195 may include the voice generated according to the user's utterance.

The electrical signal output by the sound input device 195 may be transmitted to the processor 100, and the processor 100 may perform speech recognition using the received electrical signal and perform a predetermined operation according to the speech recognition result.

For example, the sound input device 195 may be implemented using a microphone.

In addition, the electrical signal output by the sound input device 195 may be transmitted to a wireless communicator 180 after a predetermined signal processing process. In this case, the electrical signal output by the sound input device 195 may or may not pass through the processor 100. The wireless communicator 180 may convert the electrical signal output by the sound input device 195 into electromagnetic waves and transmit the electromagnetic waves to the outside. The electromagnetic waves transmitted to the outside may be received by another terminal device, e.g., a smart phone or a cellular phone, selected according to the user or a predefined setting.

The sound output device 197 is provided to be capable of outputting sound including a voice or the like.

For example, the sound output device 197 may provide the voice uttered by the user of the other terminal device to the user of the context-based operation determination apparatus 10 by outputting a sound corresponding to the electrical signal obtained from the electromagnetic waves received by the wireless communicator 180. Also, in another example, the sound output device 197 may output the sound generated according to the processing result of the processor 100. Specifically, for example, when the context-based operation determination apparatus 10 starts the operation according to a determined final operation, the sound output device 197 may output information regarding the start of the operation in the form of a sound including a voice and/or a sound effect.

For example, the sound output device 197 may be implemented using at least one speaker device that converts electrical signals into sound waves, or may be implemented using earphones or headphones.

By the voice reception operation of the sound input device 195, the transmission and reception of electromagnetic waves of the wireless communicator 180 and the voice output operation of the sound output device 197, the user may perform a voice call using the context-based operation determination apparatus 10.

According to one embodiment, the context-based operation determination apparatus 10 may further include at least one of a device connector 170 and the wireless communicator 180.

The device connector 170 is provided so that the context-based operation determination apparatus 10 may be connected to an external apparatus via at least one cable or the like.

For example, the context-based operation determination apparatus 10 may receive all or a portion of the context awareness database 141, all or a portion of the selection history database 143, the acoustic model 145, the language model 147 and at least one piece of data required for the context-based operation determination apparatus 10. The received data may be transferred to at least one of: the processor 100, the main memory device 149, and the auxiliary memory device 140.

The device connector 170 may include, for example, a universal serial bus (USB) terminal 171, or may also include one or more interface terminals such as an HDMI (High Definition Multimedia Interface) terminal, a Thunderbolt terminal, or the like.

The wireless communicator 180 is provided to be able to communicate with at least one of an external terminal device and a server device. In particular, the external terminal device may include a smart phone, a cellular phone, a tablet PC, a laptop computer, a desktop computer, a wearable device, and/or various other devices capable of performing communication.

The context-based operation determination apparatus 10 may receive various data necessary for operation of the context-based operation determination apparatus 10 from at least one of an external terminal apparatus and a server apparatus via the wireless communicator 180, or may transmit various data or commands to at least one of the terminal device and the server device.

The wireless communicator 180 may include at least one of a short-range communicator 181 and a mobile communicator 183.

The short-range communicator 181 is provided to be able to wirelessly communicate with a terminal device located in the vicinity. The short-range communicator 181 may be implemented using a communication circuit capable of transmitting and receiving electromagnetic waves. The communication circuit may include, for example, an antenna, a communication chip, a substrate and associated components, and the like.

According to one embodiment, the short-range communicator 181 may communicate with an external terminal device using predetermined local area communication technology. For example, the short-range communicator 181 may perform communication with using Bluetooth, Bluetooth Low Energy, CAN communication, Wi-Fi, Wi-Fi Direct, Wi-MAX, Ultra-wide band (UWB), Zigbee, infrared data association (IrDA) or Near Field Communication (NFC).

According to an embodiment, the context-based operation determination apparatus 10 may be paired with an external terminal apparatus using the short-range communicator 181.

The mobile communicator 183 is configured to transmit and receive data with at least one of a terminal device and a server device located at a remote location.

The mobile communicator 183 may communicate with a second terminal device 3 using mobile communication technology. For example, the mobile communicator 183 may communicate with at least one of the second terminal device 3 and a server device 4 using at least one communication technology to be based on a mobile communication standard such as 3GPP, 3GPP2, WiMAX series or the like and to be considered by the designer. For example, mobile communication standard technology may include Global System for Mobile Communication (GSM), Enhanced Data GSM Environment (EDGE), Wideband Code Division Multiple Access (WCDMA), Code Division Multiple Access (CDMA), Time Division Multiple Access (TDMA), etc.

According to one embodiment, at least two of the processor 100, the auxiliary memory device 140, the main memory device 149, the context information obtainer 150, the device connector 170, the wireless communicator 180, and the user interface 190 may transmit and receive data with each other using at least one of a circuit, a cable, and/or a wireless communication network. In particular, the cable may include, for example, a pair cable, a coaxial cable, a fiber optic cable, or an Ethernet cable. The wireless communication network may be implemented using local area communication technology or mobile communication technology.

Hereinafter, details of the operation of the processor 100 will be described. In the following description of the processor 100, blocks are separately drawn in each figure for convenience of description, but the blocks may not be separated in actual implementation. Also, at least one of the blocks of each figure may be separated physically and/or logically.

Figure 2:
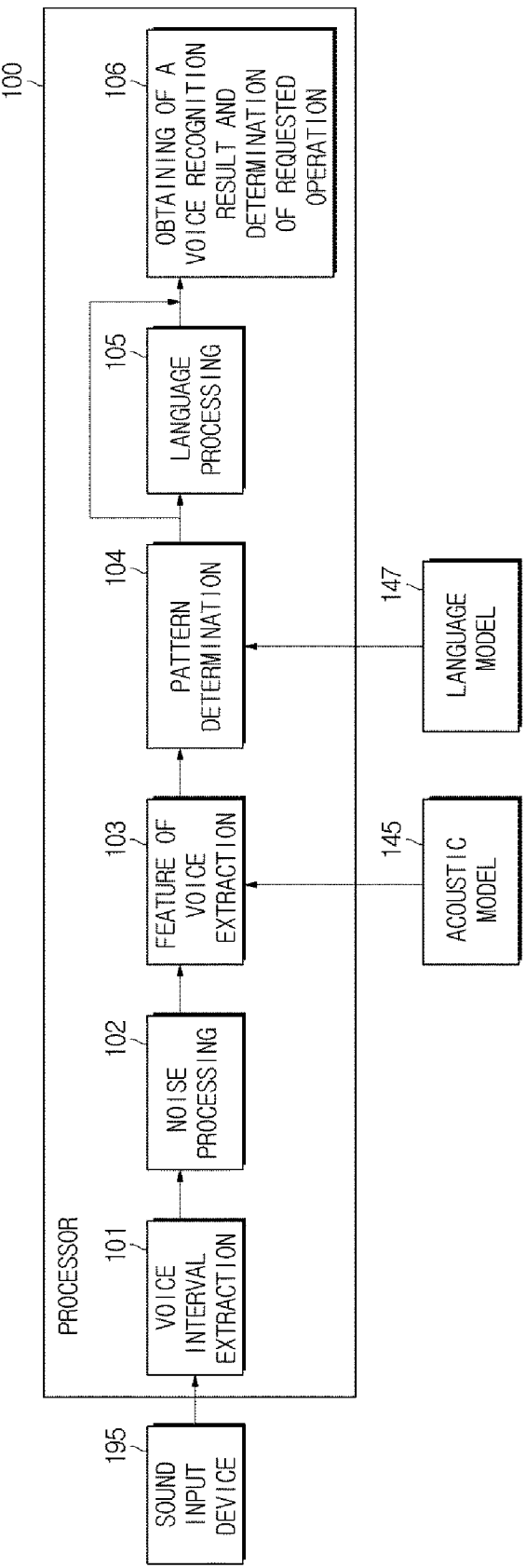
FIG. 2 is a view schematically illustrating an example of a voice recognition process by an operation of a processor.

FIG. 2 is a view schematically illustrating an example of a voice recognition process by an operation of a processor.

When the user utters a sound (i.e., the user's voice), the uttered voice is input via the sound input device 195. The sound input device 195 outputs an electrical signal that corresponds to the uttered voice, and the output electrical signal is transmitted to the processor 100 as shown in FIG. 2.

The processor 100 performs speech recognition based on the received electrical signal.

In particular, the processor 100 may extract a voice interval from a received electrical signal 101. The voice interval refers to a section in which the voice uttered by the user exists or is likely to exist.

When the speech interval is detected, the processor 100 may remove and/or attenuate noise existing in the voice interval (see step 102 of FIG. 2). The processor 100 may use at least one filter to remove and/or attenuate noise existing in the voice interval. A noise removal process 102 may be omitted depending on the embodiment.

Sequentially, the processor 100 may extract the feature of voice from the voice interval (see step 103 of FIG. 2). In this case, the processor 100 may use at least one of a linear predictive coefficient (LPC), a Cepstrum, a Mel Frequency Cepstral Coefficient (MFCC) and a Filter Bank Energy to extract features of voice from the voice interval in the form of at least one of feature vector.

In response to the extraction of the feature of the voice, the processor 100 may determine a pattern corresponding to the extracted feature of the voice (see step 104 of FIG. 2). For example, the processor 100 may determine a pattern for a feature of a voice using the predefined acoustic model 145. The acoustic model 145 may be obtained by modeling the signal characteristics of voice. The processor 100 may determine the pattern of the voice characteristic by acquiring a frequency pattern having the same or approximate frequency pattern as a human voice by using the acoustic model 145 as described above. Accordingly, a vocabulary such as a predetermined word, a syllable or a short phrase may be recognized from the voice input through the sound input device 195.

The processor 100 may further recognize a sentence or the like by performing language processing using the predetermined language model 147 as necessary (see step 105 of FIG. 2). The language model 147 may be generated based on human language and grammar so as to determine the linguistic order relationship of recognized words, syllables or phrases. Accordingly, the processor 100 may recognize the sentence corresponding to the voice.

The processor 100 may acquire a voice recognition result through at least one of a pattern determination 104 and a language processing 105 and determine an operation requested or commanded by a user through utterance in accordance with a voice recognition result (see step 106 of FIG. 2). In particular, the processor 100 may determine a reference operation corresponding to the voice recognition result, using or not using a database, and determine the determined reference operation as an operation requested by the user. The database may be constructed based on data on the voice recognition result and the reference operation corresponding to the voice recognition result. If the voice recognition is properly performed, the operation requested or commanded by the user through utterance may be the same or similar with the reference action determined by the processor 100.

If the reference operation corresponding to the recognized voice is not able to be determined, the processor 100 determines that an error has occurred in the voice recognition or the operation determination. The processor 100 may perform the voice recognition process again, or control the part(s) of the context-based operation determination apparatus 10 to request the user to speak it again or to request the user to input a command using another input device, e.g., the input device 191 as described above, other than the sound input device 195. Requests for speaking (utterance) or command input may be performed using at least one of the display device 193 and the sound output device 197.

The reference operation determined by the processor 100 may include at least one operation among various operations that may be performed by the context-based operation determination apparatus 10. For example, the reference operation may include at least one among a telephone call operation to a specific person, a telephone reception or rejection operation, an operation to set a specific place as a destination, a route guidance operation to the set destination, a temperature adjustment operation, a message transmission operation, an operation of converting at least one text included by an e-mail or a message into voice, an operation outputting a voice corresponding to a text, a music or video reproduction operation, a predetermined screen display operation and an operation of changing a channel or volume change of a radio apparatus or a television apparatus, etc.

Figure 3:
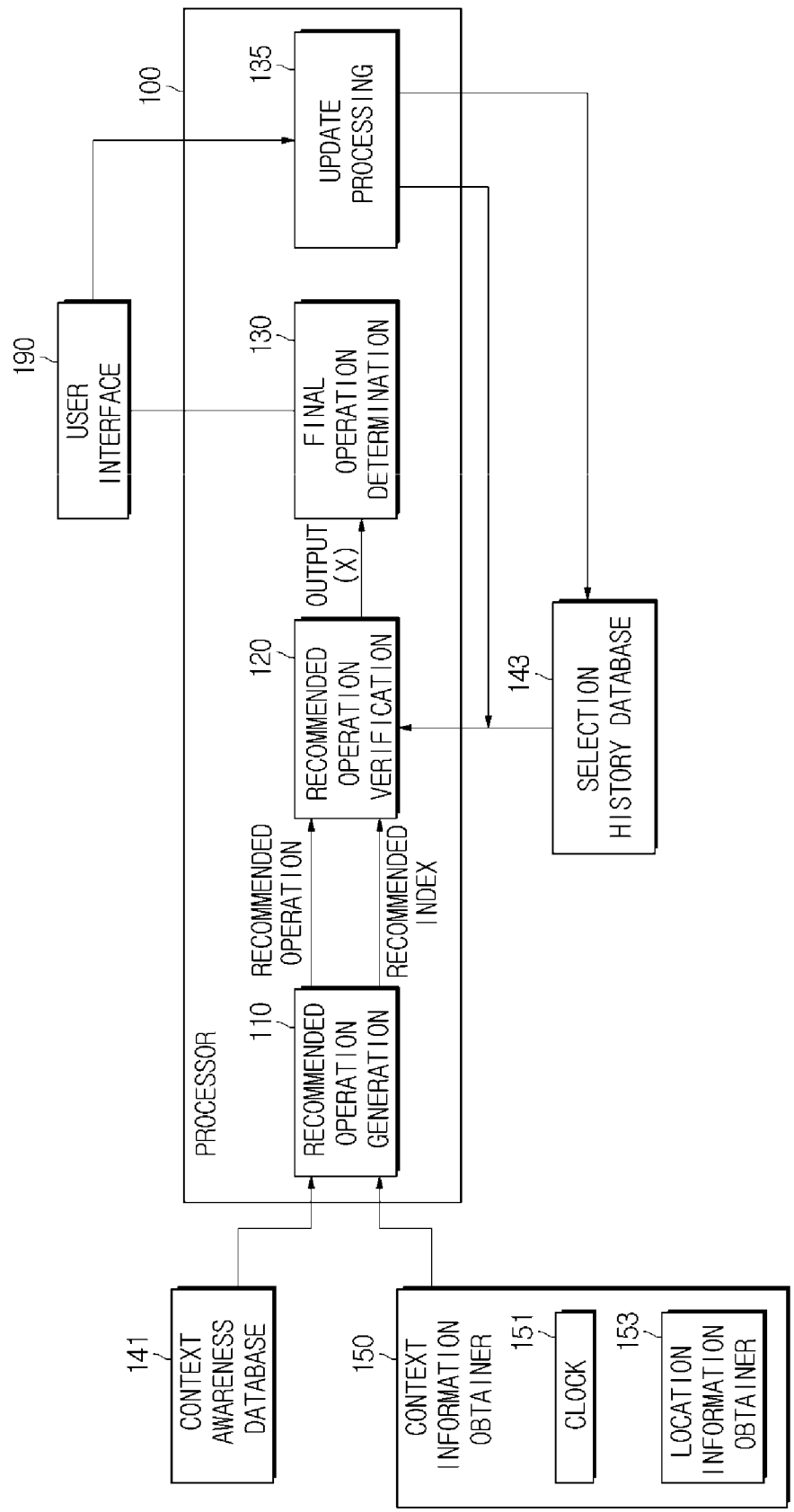
FIG. 3 is a first view describing an embodiment of a process to be performed by a processor.

FIG. 3 is a first view describing an embodiment of a process to be performed by a processor.

The processor 100 may determine a final operation using a current context and/or a pre-stored user's behavior when the reference operation is determined according to the user's command inputted through the input device 191 or the reference operation corresponding to a command of the user is determined according to the voice recognition as described above. The final operation refers to a more specific operation of the reference operation. For example, if the determined reference operation is an operation regarding a call to a certain person, the final operation may be an operation including more detailed means of communication in the reference operation. In this case, for a more detailed example, a final operation may be a call to a specific person's mobile phone.

Specifically, the processor 100 receives information for determining the current state from the context information obtainer 150 and acquires information regarding an operation selected by the user in a specific context, i.e., an operation performed by the state-based operation determination apparatus 10 previously, and then generates the recommended operation using the received or acquired information (see step 110) as shown in FIG. 3.

The processor 100 may also determine a recommendation index corresponding to the recommended operation. The recommendation index is an indicator of how proper the recommended operation is for the current context and may be implemented numerically.

Figure 4:
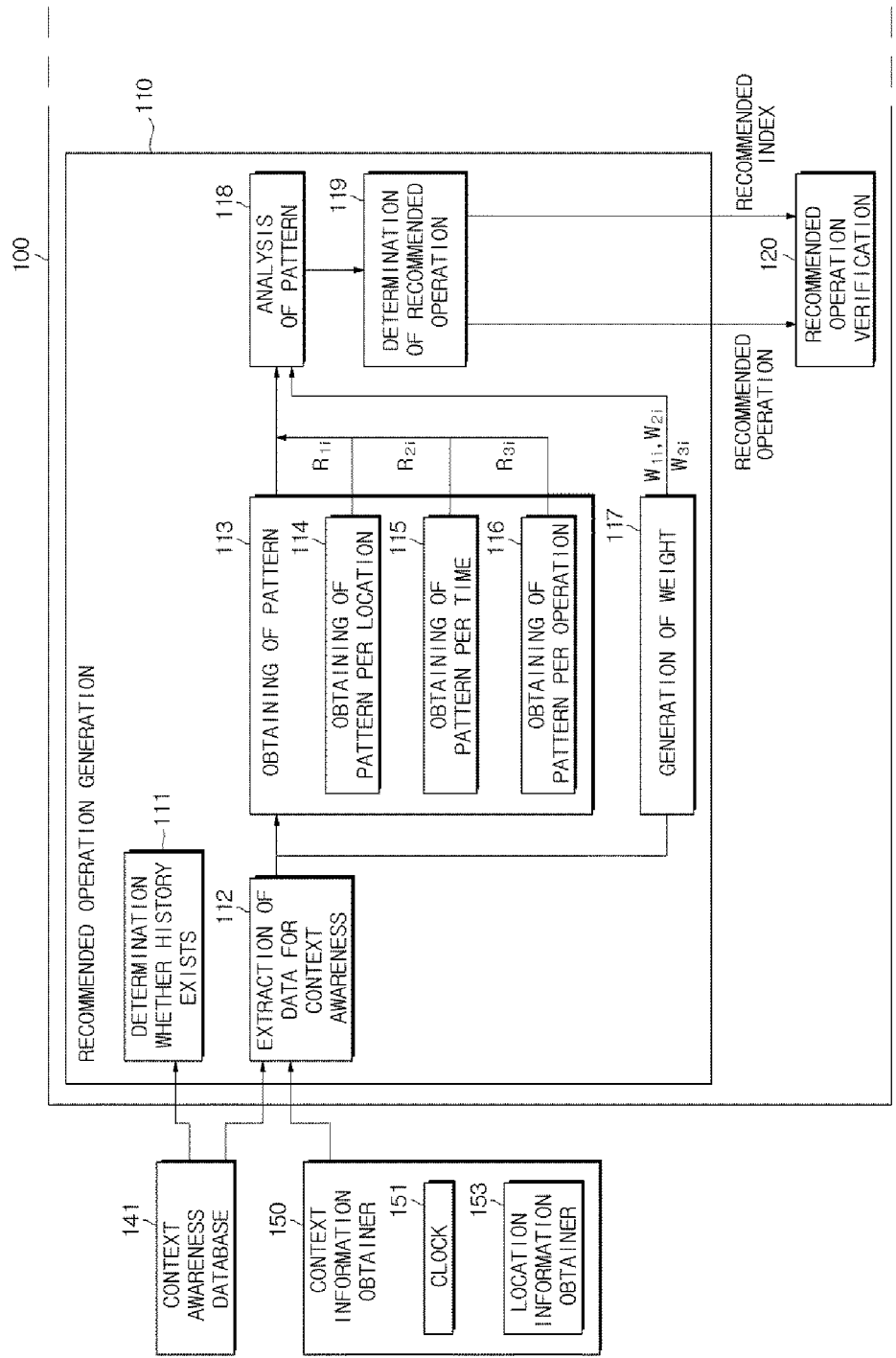
FIG. 4 is a second view illustrating one embodiment of a process to be performed by a processor.

FIG. 4 is a second view illustrating one embodiment of a process to be performed by a processor. FIG. 5 is a view illustrating a context awareness database corresponding to a telephone generation operation as an example of a context awareness database, and FIG. 6 is a view illustrating an example of a context awareness database corresponding to a destination search operation as another example of a context awareness database.

According to one embodiment, as shown in FIG. 4, the processor 100 may first determine whether a history exists or not (see step 111).

Specifically, the processor 100 may configured to attempt to invocate the context awareness database 141 corresponding to a reference operation based on a reference operation input through the input device 191 or determined through a voice recognition process and to determine whether the context awareness database 141 is invocated or not.

In this case, the processor 100 may invoke a different context awareness database 141 according to the operation requested or commanded by the user. For example, if the user input a command related to a call, then the context awareness database 141 related to the call may be invocated. Also, if the user inputs a command for controlling temperature, the context awareness database 141 related to a temperature control may be invocated. Further, if the user inputs a command for searching or setting one or more destination, the context awareness database 141 related to searching or setting one or more destinations may be invocated. In addition, the processor 100 may invoke one or more appropriate context awareness databases 141 according to the user's command.

Also, when the context awareness database 141 is invocated, the processor 100 may determine whether a previously-stored history exists in the invocated context awareness database 141 in association with the reference operation (see step 111 of FIG. 4). In other words, the processor 100 may determine whether the data necessary for generating the recommended operation exists in the context awareness database 141 or not.

If the context awareness database 141 corresponding to the reference operation is not invocated or the previously stored history, e.g., a record does not exist in the invocated context awareness database 141, the processor 100 may not perform a recommended operation generation 110, a recommended operation verification (see step 120 of FIG. 3) and the final operation 130 and may perform an operation according to a predefined setting.

For example, if the context awareness database 141 corresponding to the reference operation is not invocated or if the previously stored history is not detected in the retrieved context awareness database 141, the processor 100 may control the display device 193 of the user interface 190 to display a list including at least one piece of data that corresponds to the voice recognition result. More specifically, for example, if the reference action is a telephone call, the list may include one or more recipients and telephone numbers corresponding to the at least one recipient determined to correspond to the voice recognition results. The user may confirm the data of the displayed list and manipulate the input device 191 to select at least one of the data in the displayed list and the processor 100 may control the context-based operation determination apparatus 10 to operate according to the data selected by the user.

Also, according to an embodiment, when the context awareness database 141 corresponding to the reference operation is not invocated or the previously stored history is not detected in the invocated context awareness database 141, the processor 100 may update the context awareness database 141 using the user's selection results. For example, the processor 100 may update the context awareness database 141 by adding a record containing at least one piece of data corresponding to the selection result, e.g., the recipient and the telephone number of the recipient, to the context awareness database 141.

If the context awareness database 141 corresponding to the determined operation is invocated and the previously stored history, e.g., a record exists in the invocated context awareness database 141, the processor 100 may receive information from the context information obtainer 150 that is required for the recognition of a context.

The process 111 for determining whether the context awareness database 141 is invocated and whether there is a history in the context awareness database 141 may be omitted depending on the embodiment.

As described above, the processor 100 may acquire context information necessary for the context recognition from the context information obtainer 150. For example, the processor 100 may obtain the current time from the clock 151 of the context information obtainer 150 and/or obtain the location information of the user from the location information obtainer 153.

The processor 100 may extract at least one piece of data (e.g., at least one record or field of record data(s)) from the invocated context awareness database 141. In this case, according to an embodiment, the processor 100 may further perform a process of invocating the context awareness database 141 before extracting the data. As described above, the context awareness database 141, which is invocated from the auxiliary memory device 140, may be a database that corresponds to a reference operation that is input through the input device 191 or determined based on an operation through a voice recognition process.

According to FIGS. 5 and 6, the context awareness database 141 may include a plurality of records R11 to R15, and each of the records R11 to R15 may include an identifier f(0) for recognizing each record R11 to R15 and field data corresponding to a plurality of fields f11 to f15 and f21 to f27, respectively.

For example, referring to FIG. 5, when the context awareness database 141 is a database DB1 related to a telephone call operation, each of the records R11 to R13 may include field data that corresponds to a field of an object for call f11, a field of communication means regarding a terminal of recipient f12, a field of date for call f13, a talk time field f14, and/or a field for a place where the user places call f15, respectively.

In another example, when the context awareness database 141 is a database DB2 for an operation of searching and setting of a destination as shown in FIG. 6, each record R14 and R15 includes field data that corresponds to a field of location of interest f21, a field of a location on a map that corresponds to the location of interest f22, a field of a device used for search f23, a field of day in which the search is performed f24, a field of the search time f25, a field of searched location f26 and/or a field of other information f27.

According to FIGS. 5 and 6, the context awareness database 141, which is used to determine a recommended operation for different reference operations, may include fields and field data of the fields that are defined to be different from each other according to the feature of the reference operations. For example, the context awareness database (DB1) related to a call origination operation may include the call destination field (f11) and field data thereof, and the context awareness database (DB2) related to a destination search and setting operation may include field f21 for a point of view and field data for the field f21. In addition, for another example, the context awareness database (DB2) related to a destination setting may further include a field for a day of the week because it may usually be determined based on a day of the week due to work or the like.

Depending on the embodiment, it is possible that all the context awareness databases 141 used to determine the recommended operation for different reference operations include the same field.

The field data stored in each field f11 to f14, f21 to f27 of the context awareness database 141 may be obtained based on the actual operation of the context-based operation determination apparatus 10 according to the user's previous selection.

If the call origination operation for a particular person is determined as a reference operation based on the user's command, the processor 100 may search and obtain records corresponding to a specific person from the retrieved context awareness database 141.

Then, the processor 100 may determine a selection pattern for an action that may be recommended using the context information and the detected record (see step 113 of FIG. 4). Specifically, for example, if the user inputs a command for a call to a particular person, the processor 100 may determine a selection pattern regarding ways or means by which the user made a call to a specific person by predefined analysis criteria (e.g., location, time or overall behavior or action). More specifically, for example, when the user makes a call to a specific person, the processor 100 may determine that the user makes a call using a cell phone number of the specific person, using a telephone number that is defined as a phone number of a company and/or using a phone number that is defined as a particular person's home phone in accordance with the place, the time or the whole operation.

According to one embodiment, the processor 100 may determine (see step 114 of FIG. 4) a selection pattern for determining an operation to be performed in a specific location, a selection pattern for determining an operation to be performed at a specific time and/or a selection pattern for determining an operation to be performed in overall operation.

According to one embodiment, the processor 100 may generate and use a predetermined frequency model to determine a selection pattern for each analysis criteria.

The processor 100 may acquire result values (p$1i$, p$2i$, p$3i$, i=1, 2, 3 . . . ) for the selection pattern in each analysis criterion according to the result of performing the determination process of the selection pattern. For example, the processor 100 may obtain the result value (p$1i$) for a selection pattern according to a location (see step 114 of FIG. 4), the result value (p$2i$) for a selection pattern according to time (see step 115), and/or the result value (p$3i$) of the selection pattern for the overall operation (see step 116).

More specifically, for example, if the current location acquired by the location information obtainer 153 is a first area (e.g., a workplace or a school) and the reference operation is a telephone call to a particular person, the processor 100 detects whether or not data of the user's selection in the vicinity of the first area exists in the context awareness database 141, and if data of the user's selection in the vicinity of the first area is detected, obtains the result value (p$1i$, herein i is an index for identifying each operation) by applying a predetermined value to each element of detected selection pattern, e.g., each selected operation.

The processor 100 may obtain the result value p$1i$ corresponding to each operation in the first area, using the weight of each operation for the operation performed totally in the first area. Accordingly, the processor 100 may obtain the result value p$1i$ for the selection pattern in the first area (see step 114 of FIG. 4).

According to one embodiment, the result value p$1i$ may be defined using a selection probability or frequency for each selected action. For example, the result value (p$1i$) may be defined as a ratio of the frequency of performing a specific operation to the entire operation in the first area (e.g., the number of times of performing the specific operation/the number of times of performing the entire operation). More specifically, for example, if the number of times of calls to a specific recipient in the first area is 100 and the number of times of calls to a particular recipient's cell phone in the first area is 80, the result value (p11) corresponding to a call operation to a particular recipient's cell phone in the first area may be determined to be 0.8 and the result value (p12) corresponding to the call operation to the home phone of a particular recipient in the first area may be determined to be 0.2.

The result value p11, p12 may be variously defined according to the user's convenience. For example, instead of 0.8 and 0.2, 80 and 20 that is obtained by multiplying 0.8 and 0.2 by 100 may be defined as the result value p11 corresponding to the call operation to the particular recipient's cell phone in the first area and another result value p12 corresponding to the call operation to the particular recipient's home telephone, respectively.

If there is no user selection pattern in the first area, the result value (p$1i$) according to the location may be given as zero.

Also, in a similar way, when the current time obtained by the clock 151 corresponds to a first time zone (for example, afternoon time zone), the processor 100 may calculate a result value p2$i$ for each selected operation of the first time. For example, in the same way as described above, the processor 100 may use the selection probabilities for each selected operation in accordance with the weight of each operation for the entire operation in the first time zone to obtain the result value p2$i$ for each selected operation of the first time. If there is no user's selection pattern in the first time zone, the processor 100 may set the result value p2$i$ for time to be zero.

In addition, the processor 100 may obtain a result value p3$i$ corresponding to each selected operation without considering the location or the time. For example, the processor 100 may obtain the corresponding result value p3$i$ for each operation according to the ratio of each operation to the total operation in the same manner as described above (see step 116 of FIG. 4).

According to one embodiment, the processor 100 may sum up the obtained result values p1$i$, p2$i$, p3$i$ obtained using the different analysis criteria for a particular operation, or perform a weighted sum of the result values p1$i$, p2$i$, p3$i$ to analyze the selection pattern (see step 118 of FIG. 4).

In this case, as shown in FIG. 4, the processor 100 may further calculate weight values w11, w12, w13 to be applied to each of the result values p1$i$, p2$i$, p3$i$ for the selection pattern according to the analysis criterion, e.g., the location, the time and the overall operation (see step 117).

According to one embodiment, the weight values w11, w12, and w13 may be predefined for each analysis criterion. For example, the processor 100 may determine the weight values w11, w12, and w13 to be applied to the result values p1$i$, p2$i$, p3$i$ corresponding to each analysis criterion to be same.

For example, when all of the result values p1$i$, p2$i$, p3$i$ corresponding to the selection pattern for the location, the time and the overall operation are obtained, the processor 100 may determine the weight values w11, w12, and w13 applied to the result values p1$i$, p2$i$, p3$i$ corresponding to the selection pattern for the location, the time and the overall operation to be 0.33 equally.

According to another embodiment, the weight values w11, w12 and w13 may be determined according to the result values p1$i$, p2$i$, p3$i$ corresponding to each analysis criterion. That is, the processor 100 may determine the weight values w11, w12, and w13 to be applied to the result values p1$i$, p2$i$, p3$i$ corresponding to the respective analysis criterion equally or differently according to the result values p1$i$, p2$i$, p3$i$.

For example, when the result values p1$i$, p2$i$, p3$i$ are zero, the processor 100 may determine the weight values w11, w12, and w13 corresponding to the result values p1$i$, p2$i$, p3$i$ to be zero, and when the result values p1$i$, p2$i$, p3$i$ are not zero, the processor 100 may determine the weight values w11, w12, and w13 corresponding to the result values p1$i$, p2$i$, p3$i$ to be identical. More specifically, for example, when the result value p1$i$ for the selection pattern according to the location is zero (i.e. there is no selection pattern according to the location) and the result values p2$i$, p3$i$ for the selection pattern according to the time and the total operation is not 0 (i.e. there exist selection patterns according to time and total operation), the processor 100 may determine the weight value w11 applied to the result value p1$i$ for the selection pattern according to the location to be zero and may determine the weight values w12, w13 applied the result values p2$i$, p3$i$ for the selection pattern according to the time and the total operation to be 0.5 equally.

In addition to the above, the processor 100 may determine the weight values w11, w12, w13 to be applied to each of the result values p1$i$, p2$i$, p3$i$ using at least one method that may be considered by the designer.

When the result values p1$i$, p2$i$, p3$i$ for each operation are obtained, and as required, the weight values w11, w12, w13 for each analysis criterion are further obtained, the processor 100 analyzes the pattern and obtains an analysis result (see step 118 of FIG. 4).

According to one embodiment, the pattern analysis may be performed using a combination of result values p1$i$, p2$i$, p3$i$ for a selection pattern per analysis criterion, or using a combination of result values p1$i$, p2$i$, p3$i$ for a selection pattern per analysis criterion and the weight values w11, w12, w13 per analysis criterion.

In this case, the following equation 1 may be used for pattern analysis.

$$Zi = \sum_j w_{1j} \cdot p_{ji}$$ [Equation 1]

Herein, Zi denotes an analysis result for a specific operation, w1$j$ denotes a weight per analysis criterion, and pji denotes a result value for each operation included in each selection pattern for each analysis criterion. i denotes a value for identifying each operation, and j denotes a value for identifying each analysis criterion.

The analysis result Zi for a particular operation may be computed separately for each operation. Therefore, the number of analysis results Zi for a particular operation may be given equal to the number of operations included in the selection pattern.

For example, in the case that the user inputs an instruction regarding a call operation to a specific person, the selection pattern for the current user's position is absent, the ratio of the call using the home telephone number to the total call in the current time is 0.2, the ratio of the call using the mobile phone number to the total call in the current time is 0.8, the ratio of the call using the home telephone number to the total call is 0.3, and the ratio of the call using the mobile phone number to the total call is 0.7, the weight values w11, w12 and w13 for each context according to the above-described example may be determined 0, 0.5 and 0.5 sequentially. The analysis result (Z1) of the pattern for usage of the home telephone number is 0.25 (=0+0.2/2+0.3/2) and the analysis result (Z2) of the pattern for usage of the mobile phone number is 0.75 (=0+0.3/2+0.7/2).

The processor 100 may determine a recommended operation based on the analysis result of the pattern, and may also determine a recommendation index corresponding to the recommended operation (119).

For example, the processor 100 may compare the analysis results (Zi: Z1, Z2 . . . ) for each individual operation from each other, extract an operation that has the largest analysis result (Zi) from individual operations, and determine the extracted operation as the recommended operation. In detail, as described above, when the analysis result (Z1) of the pattern for usage of the home telephone number is calculated to be 0.25, and the analysis result (Z2) of the pattern for usage of the mobile phone number is calculated to be 0.75, the use of the mobile phone number may be determined as the recommended operation because the value of the analysis result (Z2) of the pattern for usage of the mobile phone number is relatively larger than the value of the analysis result (Z1) of the pattern for usage of the home telephone number.

In addition, the processor 100 may determine the analysis result (Zi: Z1, Z2 . . . ) for the operation determined as a recommended operation to be a recommendation index that corresponds to a recommended operation. For example, when the use of the mobile phone number is determined as the recommended operation, the processor 100 may determine the recommendation index to be 0.75 that is the value of the analysis result (Z2) for the pattern for usage of the mobile phone number.

Figure 7:
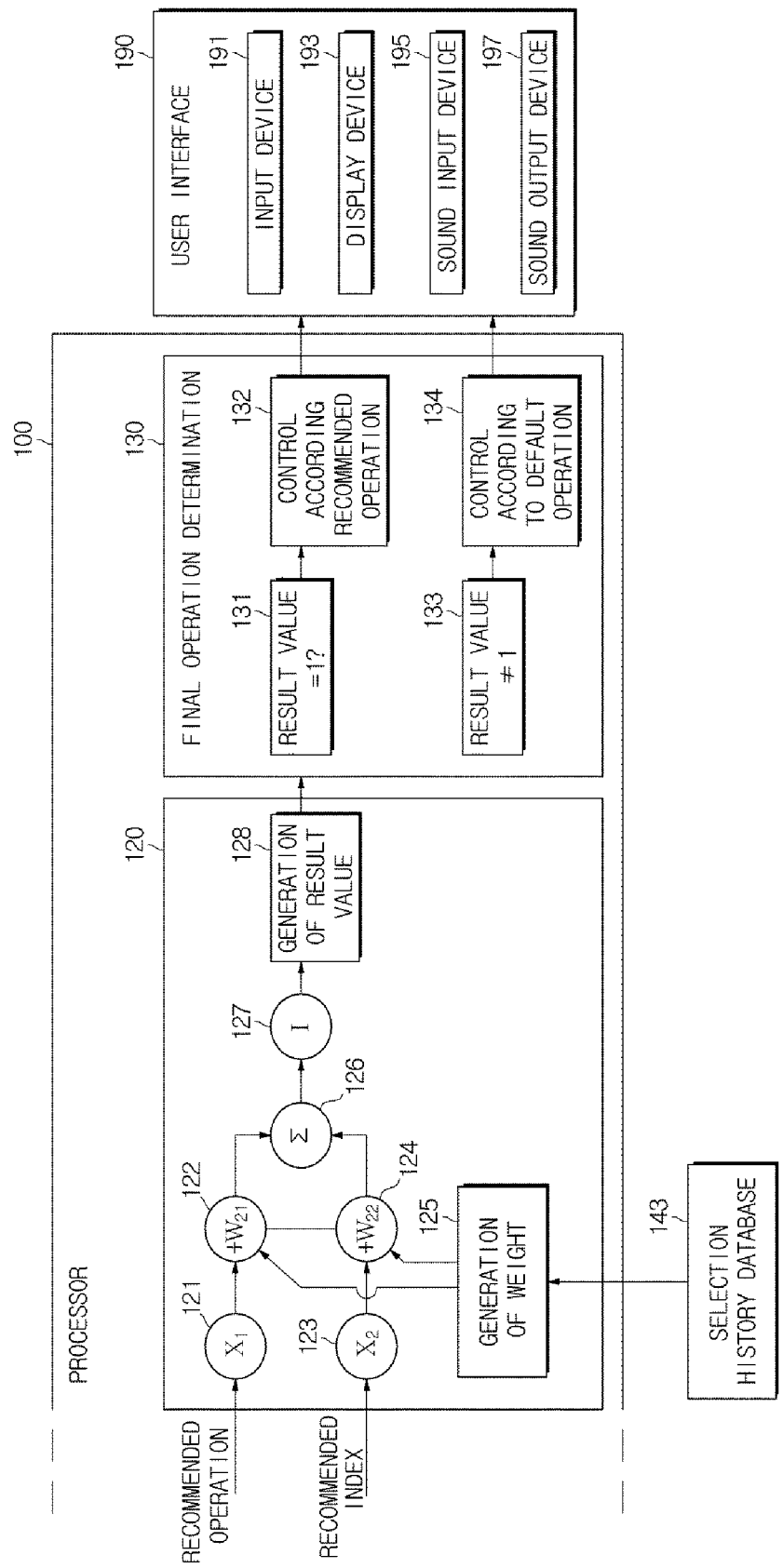
FIG. 7 is a third view explaining an embodiment of a process to be performed by a processor.

FIG. 7 is a third view explaining an embodiment of a process to be performed by a processor. FIG. 8 is a view illustrating an example of a usage history database related to a telephone generation operation in one embodiment of a selection history database, and FIG. 9 is a view illustrating an example of a usage history database related to a destination search in one embodiment of a selection history database.

Referring to FIG. 3 and FIG. 7, the processor 100 may verify the recommended operation using a recommended operation and the recommendation index 120. In this case, the processor 100 may further use the selection history database 143 obtained by accumulating the user's selection results for the recommended operation to determine whether the determined recommended operation is appropriate in view of the user's selection history.

When the recommended operation and the recommendation index are determined, the processor 100 may perform a predefined calculation using the recommended operation and the recommendation index to verify the recommended operation, and obtain a predetermined result value X.

According to one embodiment, the processor 100 may determine a first variable x1 and a second variable x2 that are able to be computed, respectively (see steps 121, 123). Each of the first variable (x1) and the second variable (x2) corresponds to a recommended operation and the recommendation index. Then, the processor 100 may add a predetermined weight corresponding to each of the first variable x1 and the second variable x2, i.e., the first weight w21 and the second weight w22 (see steps 122, 124) and obtain the result value X by performing a predefined calculation process for the first variable x1 weighted by the first weight w21 and the second variable x2 weighted by the second weight w22 (126).

In determining the first variable x1, the processor 100, for example, may determine the first variable x1 corresponding to the recommended operation by obtaining a value, that corresponds to the recommended operation and is able to be processed, according to a predefined setting and by determining the obtained value as the first variable x1 (see step 121).

In determining the second variable x2, the processor 100 may determine the second variable x2, for example, using the recommendation index itself or modifying the recommendation index partially.

According to one embodiment, the predefined calculation may include a sum of the first variable x1 weighted by the first weight w21 and the second variable x2 weighted by the second weight w22. In other words, the processor 100 may obtain the result value X by performing the weighted sum of the recommended operation (or the value corresponding to the recommended operation) and the recommendation index (or the value corresponding to the recommendation index).

In this case, the processor 100 may calculate the following equation 2 to obtain the result value X.

$$X = \Sigma w_m x_m \quad \text{[Equation 2]}$$

Herein, X denotes a result value obtained by the processor 100, wm denotes a weight added to each variable, and xm denotes an m-th variable that may be processed. As described above, m may include 1 and 2, and may include 3 or more natural numbers, depending on the embodiment. For example, in the case of using other variables in addition to the recommended operation and the recommendation index described above to verify the recommended operation, m may also include three or more numbers corresponding to the number of variables to be used.

According to the embodiment, the predefined calculation may include a calculation method other than the sum of the first variable x1 weighted by the first weight w21 and the second variable x2 weighted by the second weight w22. For example, the predefined operation may be defined by using any one of the arithmetic operations alone, or may be defined by combining at least two operations among the arithmetic operations. In addition, the predefined operation may be defined by further using an exponent or a square root.

The predetermined weights w21 and w22 may be obtained based on the records stored in the selection history database 143.

As shown in FIGS. 8 and 9, the processor 100 may call the selection history databases DB3, DB4 which are different from each other according to the default operation or the recommended operation and determine predetermined weights w21 and w22 using the retrieved selection history databases DB3, DB4.

For example, if the default operation is a telephone call, the processor 100 may use the selection history database (DB3) for the telephone call as shown in FIG. 8, and if the default operation is a destination search and setting, the processor 100 may use the selection history database 143 for the destination search and setting, as shown in FIG. 9.

The selection history database 143, DB3, DB4 may include a plurality of records r21, r22, r23 and r24. Each of the records r21, r22, r23 and r24 may include at least one field data corresponding to each of at least one field f31 to f33 and f41 to f43. In this case, each of the fields f31 to f33 and f41 to f43 may include fields f31, f41 for the recommended operation or the final operation that were determined previously, fields f32, f42 for the recommendation index corresponding to the recommended operation or the final operation that were determined previously and fields f33, f43 for the operation performed actually when the predetermined recommended operation or the final operation that were determined previously are presented to the user.

For example, as shown in FIG. 8 the selection history database (DB3) relating to the telephone call, each of the fields f31 to f33 of one record, e.g., the first record r21, may sequentially include field data for information indicating that the call origination using the mobile phone number was determined to be a recommended operation, field data for information that a recommendation index for the determined recommended operation was determined to be a certain value, for example, 89, and field data for information that the call origination was performed using the mobile phone number.

For another example, as shown in FIG. 9, the selection history database (DB4) relating to the destination search and setting, each of the fields f34 to f36 of one record, e.g., the second record r24 may sequentially include field data for information that a specific location, e.g., a first theater was determined as a final operation, field data for information that the recommendation index used for determining the final operation was a certain value, for example, 54, and field data for information that the user actually set a second theater as the destination.

The processor 100 may generate or obtain weights w21 and w22 using field data stored in each records r21, r22 or r23, r24 of the selected selection history databases DB3, DB4 when the processor 100 calls the different selection history databases DB3, DB4 according to the default operation or recommended operation. In this case, the processor 100 may acquire the weights w21 and w22 by using a predefined predetermined model or may acquire the weights w21 and w22 after generating a predetermined model generated using the selection history database 143.

According to an embodiment, the processor 100 may transfer the field data stored in the respective records r21, r22 or r23, r24 in a computable form by assigning different values to each operation, and perform regression analysis in which the actual operation is defined as a dependent variable and the recommended operation and the recommendation index are defined as independent variables to obtain the first weight W21 to be applied to the first variable x1 for the recommended operation and the second weight w22 to be applied to the second variable x2 for the recommended index. In this case, the coefficient obtained by the regression analysis result may be determined as the first weight w21 and the second weight w22 directly or after partially modified.

According to another embodiment, the processor 100 may calculate a correlation between the actual operation and the recommended operation and a correlation between the actual operation and the recommendation index and obtain the first weight W21 to be applied to the first variable x1 for the recommended operation and the second weight w22 to be applied to the second variable x2 for the recommended index.

Further, according to another embodiment, the processor 100 may determine the weights w21 and w22 using a predetermined algorithm so as to minimize the error between the final operation and the actual operation.

For example, the error may be defined as the result of summing the squares of the differences between at least one final operation and at least one actual operation corresponding to at least one final operation and dividing the sum by two.

According to one embodiment, the predetermined algorithm may include a gradient descent algorithm. In this case, a future weight may be defined as a value obtained by adding the parameter for adjusting the distance to be moved and the change amount of the weight to the current weight or subtracting the parameter and the change amount from the current weight.

In addition, the predetermined algorithm may be a learning algorithm. For example, the learning algorithms may include at least one of Deep Neural Network (DNN), Convolutional Neural Network (CNN), Recurrent Neural Network (RNN), Deep Belief Network (DBN) and Deep Q-Networks, and/or may further include an algorithm obtained by reforming these partially.

Sequentially, the processor 100 may generate a verification result value O for verification of the recommended operation based on the value X obtained in accordance with the summation (128).

According to one embodiment, the processor 100 may determine whether the value X obtained according to the summation is larger or smaller than a predefined reference value, and generate the verification result value O based on the determination result (see steps 127, 128).

In this case, the processor 100 may obtain the verification result value (O) using, for example, the following equation 3.

$$O(X) = \begin{cases} 1 & \text{if } X \geq C_{Ref} \\ 0 & \text{if } X < C_{Ref} \end{cases} \quad \text{[Equation 3]}$$

$O(\cdot)$ denotes a verification result value, X denotes a result value obtained by the calculation result of Equation 2, and Cref denotes a reference value, which is a constant predefined by the user or designer.

As described in Equation 3, when the obtained result value X is greater than the predefined value Cref, the processor 100 may set the verification result value O according to the recommended operation verification process as the first value, e.g., 1. On the other hand, when the result value X obtained by the processor 100 is smaller than the predefined value Cref, the processor 100 may set the verification result value O according to the recommended operation verification process as the second value, e.g., 0, different from the first value. When the result value X obtained by the processor 100 is equal to the predefined value Cref, the processor 100 may set the verification result value O according to the recommended operation verification process as one between the first value and the second value. The first value and the second value may be arbitrarily defined by the designer or the user, respectively.

When the result value O according to the recommended operation verification process is determined, the processor 100 may determine the final operation based on the recommended operation and the verification result of the recommended operation, as shown in FIGS. 3 and 7 (see step 130). If it is determined that the determined recommended operation is met or is likely to meet the user's intention as a result of determination using the recommended operation, the recommendation index and the selection history database 143, the processor 100 may determine the recommended operation to be the final operation. On the other hand, when it is determined that the determined recommended operation does not meet or is unlikely to meet the user's intention, the processor 100 may determine an operation according to the predetermined setting as the final operation.

According to one embodiment, the processor 100 may determine a recommended operation as a final operation 132 when the verification result value O according to the recommended operation verification process is the first value, for example, 1.

Accordingly, the processor 100 may determine a more appropriate final operation according to a reference operation that corresponds to a command input by the user's manipulation or the voice input.

For example, when the reference operation is a telephone call operation, the processor 100 may determine the telephone call operation using the determined telephone number as a final operation as described above. In addition, in another example, the processor 100 may determine at least one of operation, e.g., a rejection of an incoming call, a destination setting operation, a route guidance operation for the set destination, a temperature adjustment operation, a message sending operation, a voice transference operation for a text included in an e-mail or a message, a sound output operation corresponding to the text, a music or moving picture reproduction operation, a predetermined screen displaying operation, an operation of changing a channel or volume of a radio apparatus or a television apparatus, and other operations that may be considered by the designer, as a final operation.

When the final operation is determined, the processor 100 may operate so that the context-based operation determination apparatus 10 performs the operation corresponding to the determined final operation and/or control at least one part of the context-based operation determination apparatus 10 in response to the determination of the final operation.

In this case, according to the predefined setting by the user or designer, the processor 100 may inquire the user whether the context-based operation determination apparatus 10 is allowed to operate according to the determined final operation or not before the final operation is performed. If the user agrees with the operation of the context-based operation determination apparatus 10 according to the final operation, the processor 100 may perform an operation such as computation and processing such that the context-based operation determination apparatus 10 performs the determined final operation and/or may control at least one part of the context-based operation determination apparatus 10.

Figure 10:
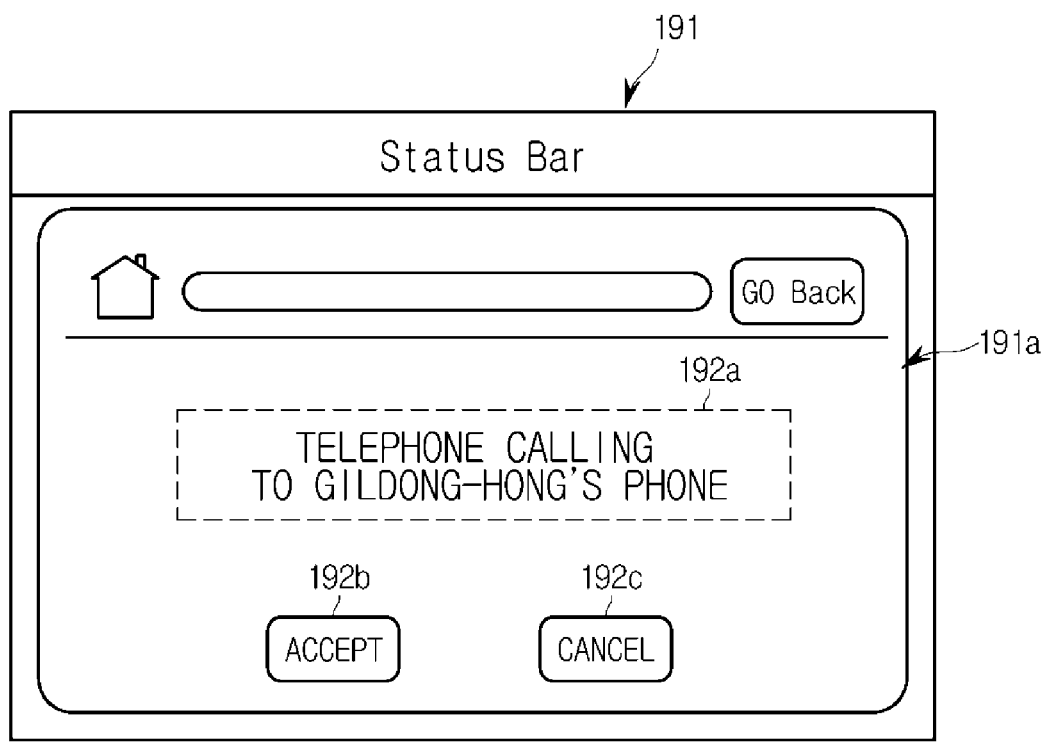
FIG. 10 is a view showing an embodiment of a screen for displaying a recommendation result.

FIG. 10 is a view showing an embodiment of a screen for displaying a recommendation result.

According to one embodiment, the processor 100 may inquire whether to approve a final operation while performing the final operation.

For example, the processor 100 may control the display device 193 of the user interface 190 to display a screen 191a for inquiring whether the final operation is approved or not as shown in FIG. 10. In the screen 191a for inquiring whether the final operation is approved or not, information 192a on the final operation and predetermined images 192b, 192c for guiding the selection of approval and disapproval of the final operation may be displayed. The predetermined images 192b and 192c may be implemented using, for example, an icon or a virtual button.

The user may manipulate the input device 191 to input a command of selecting one between approval and disapproval. When the input device 191 and the display device 193 are implemented using the touch screen, the user may select one of the displayed images 192b, 192c and inputs the command of selecting one between approval and disapproval.

If the user approves the operation of the context-based operation determination apparatus 10 according to the final operation, the context-based operation determination apparatus 10 operates according to the final operation.

On the other hand, if the user does not approve the operation of the context-based operation determination apparatus 10 according to the final operation, the context-based operation determination apparatus 10 may stop the operation according to the determined final operation. In this case, the context-based operation determination apparatus 10 may perform an operation as previously defined. For example, the context-based operation determination apparatus 10 may perform at least one default operation as described below.

When the default operation is performed, the display device 193 of the context-based operation determination apparatus 10 may display a screen 191b including a plurality of options (192d1, 192d2 in FIG. 9) which will be described later. The user may select one of the plurality of options 192d1 and 192d2 using the input device 191 to allow the context-based operation determination apparatus 10 to perform a desired operation. If the user does not select any one of the plurality of options 192d1, 192d2 and a predetermined time has elapsed, the processor 100 may terminate the context-based operation determination process.

According to one embodiment, if the user approves or does not approve the operation of the context-based operation determination apparatus 10 according to the final operation, the processor 100 may update the selection history database 143 in response to the approval or the disapproval (see step 135).

Specifically, the processor 100 may further generate a record of which field data includes the obtained recommended operation, the recommendation index and the final operation according to the user's approval in the selection history database 143, respectively. According to one embodiment, the processor 100 may be configured to update the selection history database 143 only if the user does not approve the final operation (see step 135).

Figure 11:
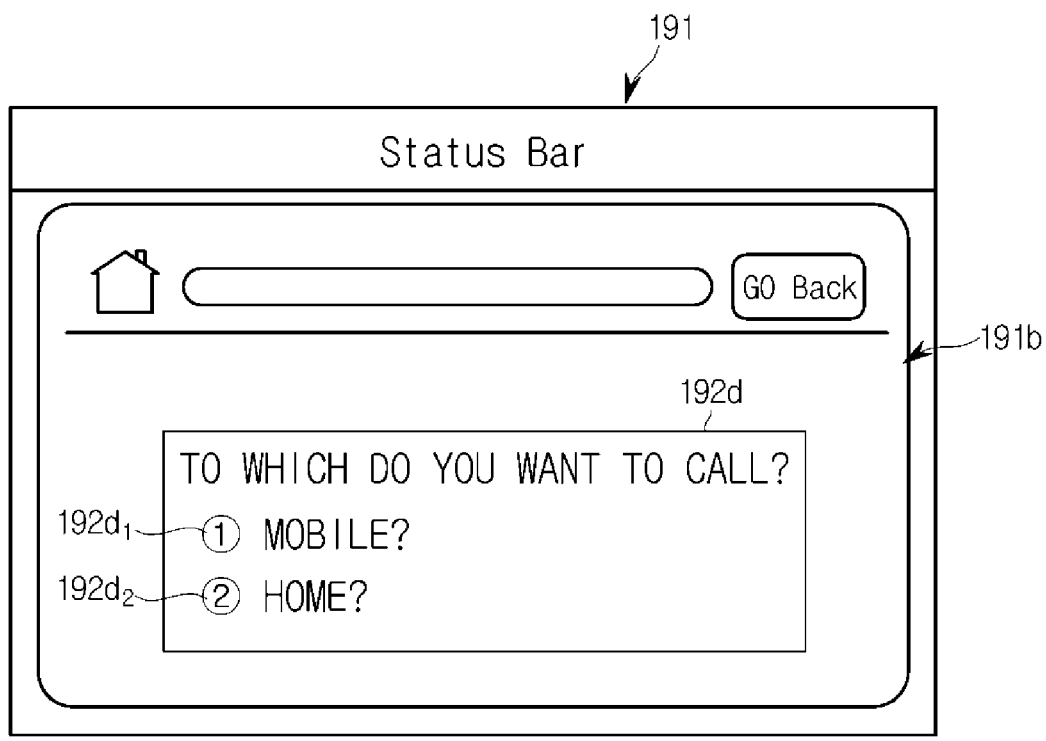
FIG. 11 is a view showing an example of a screen displayed without a recommendation result.

FIG. 11 is a view showing an example of a screen display without a recommendation result.

According to another embodiment, when the verification result value O according to the verification process of the recommended operation is not the first value, for example, 1 (see step 133), the processor 100 may be configured not to determine the recommended operation as the final operation and to determine the predefined other operations, for example the default operation as the final operation (see step 132). In the case that the result value O is not the first value, the verification result value O according to the verification process of the recommended operation may include the second value, for example, 0, as described above.

The default operation may include, for example, the display operation of the default screen 191b by the display device 193 as shown in FIG. 11.

In detail, the processor 100 may control the display device 193 to display the default screen 191b in response to a determination result that the verification result value O according to the verification process of the recommended operation is not 1. The default screen 191b may include the plurality of options 192d1, 192d2 and the plurality of options 192d1, 192d2 may be displayed using at least one character, at least one sign, at least one number or at least one image. As needed, the processor 100 may control at least one selection 192d1, 192d2 to be displayed on the screen 191b by displaying the predetermined window 192d on the screen 191b.

Each of at least one of the options 192d1, 192d2 may present various operations that are able to be performed by the context-based operation determination apparatus 10, for example, a call operation using a mobile phone number, a call cellphone using a home telephone number, and/or a call cellphone using a company telephone number respectively.

The user may select any one of the at least one options 192d1, 192d2 so as to allow the context-based operation determination apparatus 10 to operate as intended by the user.

According to an embodiment, when the user does not select any of the plurality of options 192d1, 192d2 and a certain amount of time has elapsed, the processor 100 may terminate the context-based operation determination process and the context-based operation determination apparatus 10 may ignore any command input by the user via at least one of the input device 191 and the sound input device 195 and may not perform the operation corresponding to the user's command.

The context-based operation determination apparatus 10 described above is also applied to a vehicle. Hereafter, a vehicle capable of determining an operation based on a context will be described with reference to FIG. 12.

Figure 12:
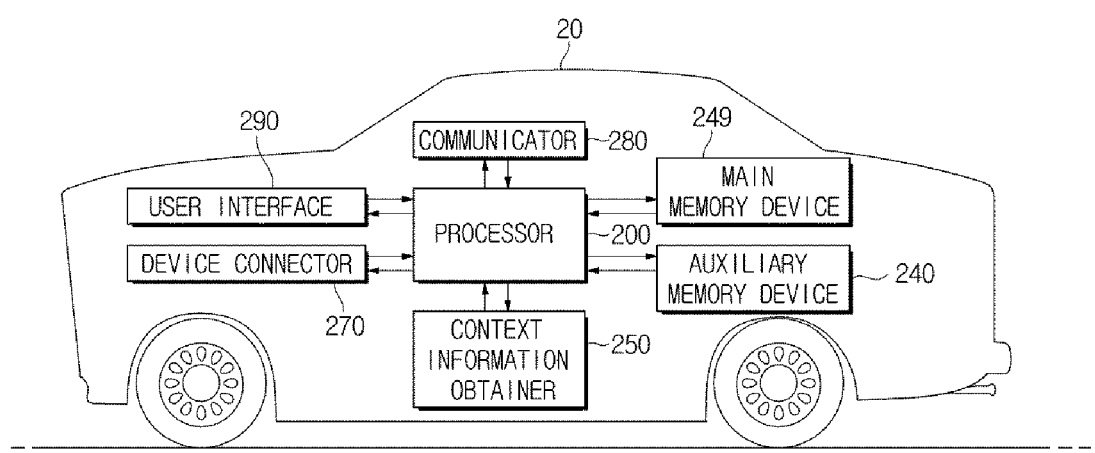
FIG. 12 is a block diagram of one embodiment of a vehicle.

FIG. 12 is a block diagram of one embodiment of a vehicle.

According to FIG. 12, in one embodiment, a vehicle 20 may include a processor 200, an auxiliary memory device 240, and a context information obtainer 250, and may further include a main memory device 249, a connection terminal 270, a communicator 280, and a user interface 290.

The processor 200 may perform various operations and processes required for the vehicle 20 and electronic control for at least one operation that the vehicle 20 may perform. The processor 200 may be implemented using an electronic control unit installed inside the vehicle 20 or may be implemented using a central processing unit of a navigation device installed inside the vehicle 20, etc.

The processor 200 of the vehicle 20 may perform speech recognition using the sound input device of the user interface 290 as described above and may also perform by determining a recommended operation using a context awareness database and speech information collected by the context information obtainer 250, verifying the recommended operation using a selection history database, determining a final operation based on the result of the verification and controlling the vehicle 20 or various devices installed in the vehicle 20, for example, a navigation device or a head unit based on the determination of the final operation.

The auxiliary memory device 240 may temporarily or permanently store various kinds of information required for the operation of the vehicle 20, for example, the context awareness database and the selection history database. If desired, the auxiliary memory device 240 may further store an acoustic model or a language model for speech recognition.

The context information obtainer 250 may obtain information on the current time or the location information of the vehicle 20. According to an embodiment, the context information obtainer 250 may obtain a vehicle speed, a travelling direction, the driver's condition or context, the presence of at least one passenger, or at least one other information that is able to be used for the context recognition.

The main memory device 249 may temporarily or permanently store data or algorithms necessary for the operation of the processor 200, and may store at least one of the context awareness database and the selection history database as needed.

The connection terminal 270 is provided to receive various data necessary for the operation of the vehicle 20 or to output information generated by the vehicle 20 to the outside. The connection terminal 270 may be communicatively connected to a terminal device such as a smart phone or a tablet PC using a cable corresponding to the connection terminal 270 and the driver of the vehicle 20 may control a smart phone or a tablet PC connected to the connection terminal 270 based on the communicative connection using the vehicle 20.

The communicator 280 may connect the vehicle 20 and an external device, for example, a terminal device or a server device through a wireless communication network. The wireless communication network may be implemented using at least one of a short range communication technique and a mobile communication technique. For example, the communicator 280 may include a Bluetooth communication module, and a head unit or a navigation device installed in the vehicle 20 and the vehicle 20 may be paired with the terminal device, e.g., a smart phone, a tablet PC, or the like using the Bluetooth communication module.

The user interface 290 may include an input device, a display device, a sound input device and/or a sound output device.

The input device and the display device may be installed at least one device such as a steering wheel, a dashboard, a center fascia, a dashboard, a gear box or a navigation device installed inside the vehicle 20 or a location that may be considered by the designer.

At least one sound input device may be installed in a predetermined space in the vehicle 20, and according to the designer's choice, may be installed at a position where the sound input device may easily receive the user's speech. For example, the sound input device may be installed on the center fascia, the steering wheel, the instrument panel or its surroundings, a rear view mirror or its surroundings, and/or the vicinity of a sun visor, taking into consideration the direction of sound waves transmitted by the user's utterance.

The sound output device may output sounds including voice and the like. The sound output device may be implemented using, for example, at least one speaker device, and at least one speaker device may be connected to the vehicle 20, such as a door, dashboard, center fascia and/(Rear Shelf) or the like.

Each of the processor 200, the auxiliary memory device 240, the main memory device 249, the context information obtainer 250, the connection terminal 270, the communicator 280 and the user interface 290 is provided to perform an operation that is identical to or modified from each of the processor 100, the auxiliary memory device 140, the main memory device 149, the context information obtainer 150, the device connector 170, the wireless communicator 180 and the user interface 190 of the context-based operation determination apparatus 10 described with reference to FIGS. 1-11. Therefore, a detailed description of the operation of each of these (see reference numbers 200, 240, 249, 250, 270, 280, 290) will be omitted below.

Figure 13:
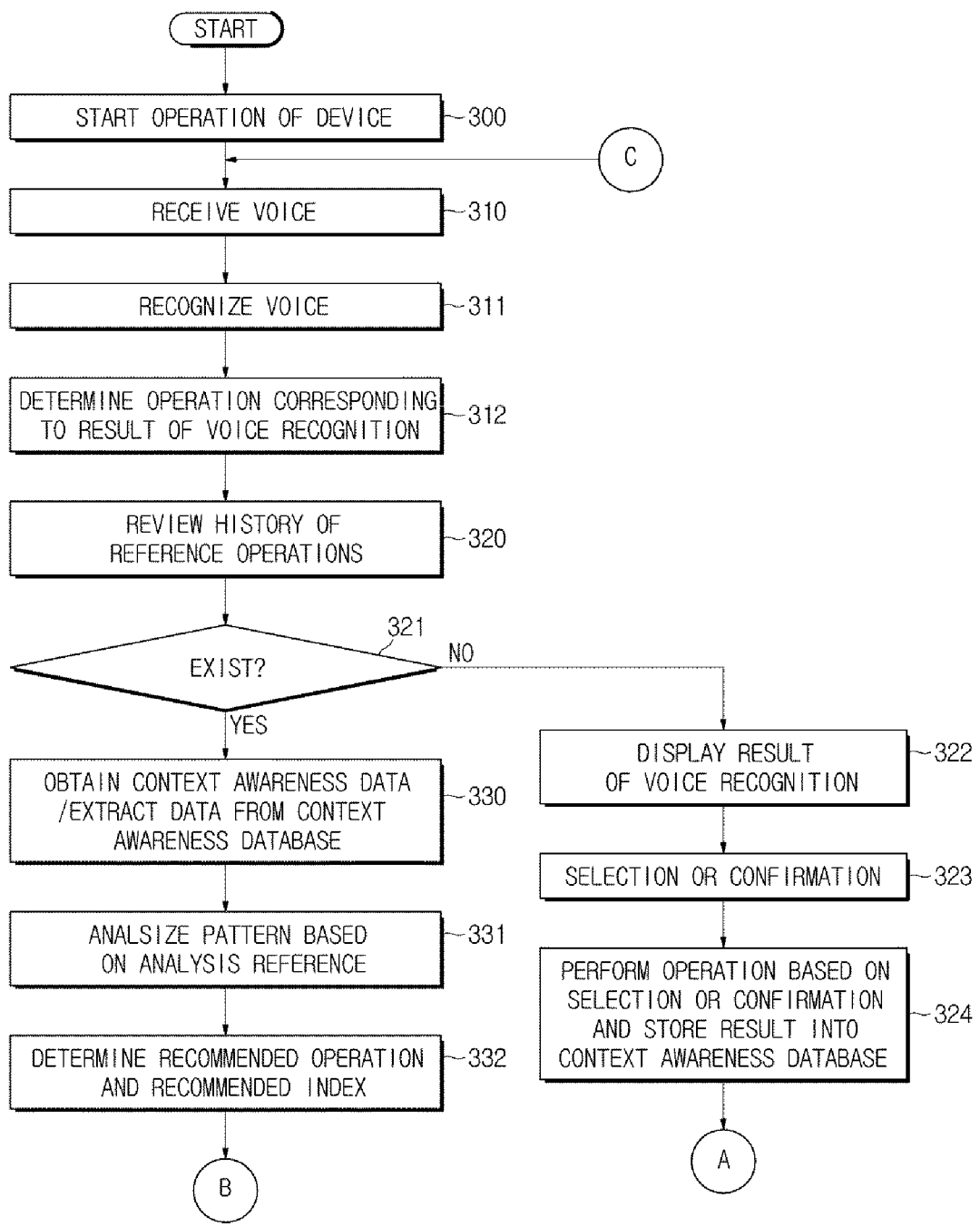
FIG. 13 is a first flowchart of an embodiment of a method of controlling a context-based operation determination apparatus.
Figure 14:
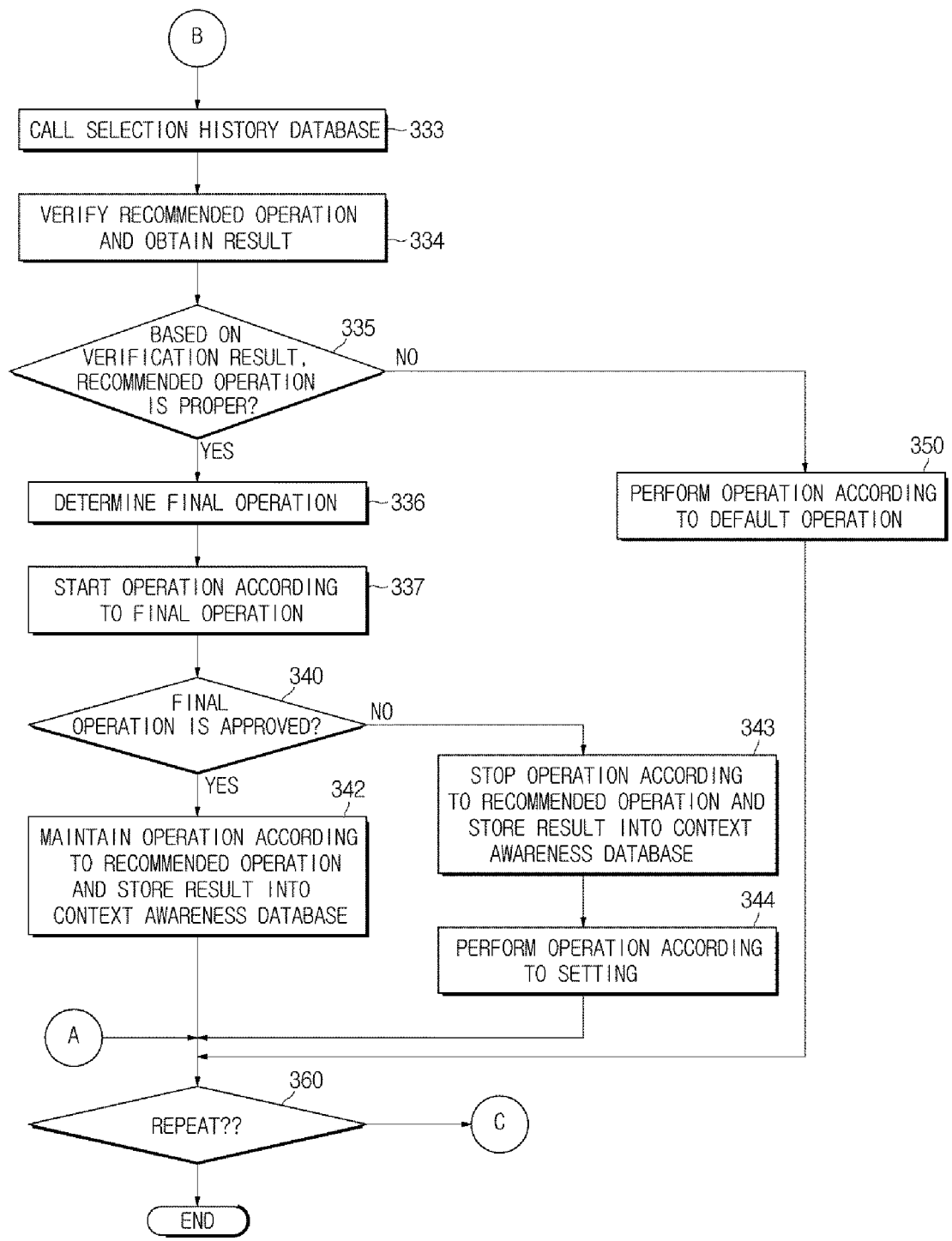
FIG. 14 is a second flowchart of an embodiment of a method of controlling a context-based operation determination apparatus.

One or more embodiments of a method of determining a context-based operation is described referring to FIGS. 13-14.

FIG. 13 is a first flowchart of an embodiment of a method of controlling a context-based operation determination apparatus, and FIG. 14 is a second flowchart of an embodiment of a method of controlling a context-based operation determination apparatus.

Referring to FIG. 13, a context-based operation determination apparatus starts its operation according to a predefined setting or a manipulation of a user (see step 300).

According to one embodiment, a user may utter a voice corresponding to a predetermined command, and a context-based operation determination apparatus may receive the voice uttered by the user along with other sounds and obtain an electrical signal corresponding to the received sounds and voice (see step 310).

The context-based operation determination apparatus detects speech portions from the electrical signal and performs speech recognition using at least one of an acoustic model and a language model (see step 311).

When speech recognition is performed, a corresponding reference operation may be determined according to the result of speech recognition (see step 312).

According to another embodiment, the above-described steps 310 to 312 may be omitted. Instead of the above-described steps 310 to 312, the user may directly input a predetermined command by operating a keyboard or a touch screen and the determination apparatus may determine a reference operation corresponding to the inputted command.

When the reference operation has been determined, it may be reviewed whether there exists a history that the context-based operation determination apparatus operates according to the reference operation (see step 320). For example, the context-based operation determination apparatus may review whether there exists data corresponding to a reference operation in a context awareness database or whether there exist a history corresponding to a reference operation in a context awareness database (see steps 320, 321).

As a result of the review, if a context awareness database is detected and it is not determined that there exists a history from the context awareness database (No in 321), the context-based operation determination apparatus may perform a predetermined operation (see steps 322, 323, 324)

For example, the context-based operation determination apparatus may display a speech recognition result using a display device, a reference operation corresponding to a speech recognition result or at least one operation that is able to be performed according to the reference operation (see step 322).

Sequentially, the user may confirm the displayed speech recognition result or the reference operation, or select any one of one operation among at least one operation that may be performed according to the reference operation (see step 323).

In response to the user's confirmation or selection, the context-based operation determination apparatus may perform a confirmed operation, e.g., a reference operation, or perform one of the operations selected by the user (see step 324).

According to an embodiment, the context-based operation determination apparatus may further update the context awareness database by storing the user's confirmation or selection result, after an operation starts, before the operation starts or at the same time when the operation starts.

As a result of the review, if a context awareness database is detected and a history is found from the context awareness database (YES in 321), the context-based operation determination apparatus may acquire at least one piece of data from the context awareness database and further acquire at least one piece of information necessary to determine the recommended operation, e.g., a current time or the location information from the context information obtainer (see step 330).

The context-based operation determination apparatus may analyze the selection pattern corresponding to the reference operation using the information obtained from the context awareness database and the information obtained from the context information obtainer (see step 331).

In this case, the context-based operation determination apparatus may obtain result values for each operation on the basis of at least one analysis criterion, obtain the analysis results using a weighted sum of the result values corresponding to different analysis criteria and obtained for the operations that correspond to each other and analyze the selection pattern by comparing the analysis results for each operation.

Herein, the context-based operation determination apparatus may be provided to obtain a result value for each operation over time, a result value for each operation over the position and a result value for each operation over the entire operation.

The result value for each operation of at least one analysis criterion may be computed using the number or frequency of occurrence of each operation relative to the total operation of at least one analysis criterion.

The weights used for the weighted sum may be determined to be the same or different per each result value for each analysis criterion. In addition, at least two weights among the three or more weights may be the same as each other but different from other weights.

According to the analysis result, the context-based operation determination apparatus may determine the recommended operation and the recommendation index (see step 332).

For example, the context-based operation determination apparatus may compare the analysis results for each individual operation from each other, extract the operation with the largest value of the analysis result for each individual operation, and determine the extracted operation as the recommended operation.

In addition, the context-based operation determination apparatus may determine the value of the analysis result corresponding to the extracted recommended operation as a recommendation index.

When the recommended operation and the recommendation index are determined, the selection history database is retrieved (see step 333), the recommended operation is verified using the selection history database, and the results of the verification may be obtained (see step 334).

For example, so as to verify the recommended operation, a predefined computation is performed based on the recommended operation and the recommendation index, and a value corresponding to the verification result may be obtained according to the computation result. In this case, the above-described equations 2 and 3 may be used. Specifically, the result value is obtained by adding a weight, that is calculated using a model to be acquirable by the selection history database, to each recommended operation (or a value determined in correspondence to the recommended operation) and recommendation index (or a value obtained by adding, multiplying and/or subtracting a predefined value to and/or from the recommendation index), the result value is compared with a reference value and a predefined value, e.g., 0 or 1 may be obtained based on the result of the comparison. In particular, any one of the obtained values may be used as the verification result of the above-described recommended operation.

Sequentially, the verification results are used to determine whether the recommended operation is appropriate (see step 335).

According to one embodiment, if the verification result is a predefined value, e.g., 1, then the recommended operation is determined appropriate (YES in 335) and the recommended operation is determined as the final operation see step (336).

The context-based operation determination apparatus may perform an operation according to a final operation (see step 340). In this case, according to the embodiment, the final operation may be started immediately without inquiring of the user whether the operation is started or not, or the final operation may be started depending on whether the user is selected or not.

According to one embodiment, the context-based operation determination apparatus may inquire the user whether the final operation is approved or not (see step 341), and output a screen including information about the final operation and an image for the choice of approval or disapproval through a display device. According to an embodiment, instead of the display device or in addition to the display device, the sound output device may output a voice to guide selection of approval or disapproval.

If the user inputs a command of approval by an input device manipulation or by input through the sound input device to approve the final operation (YES in 341), the context-based operation determination apparatus may continue the final operation (see step 342). According to one embodiment, the context-based operation determination apparatus may store the data of the recommended operation, the final operation, the recommendation index and/or the operation actually selected by the user (e.g., the final operation) in the selection history database, so as to update the selection history database.

If the user does not approve the final operation (No in 341), the context-based operation determination apparatus may stop performing the final operation (see step 343). In this case, the context-based operation determination apparatus may store the data of the recommended operation, the final operation, the recommendation index and/or the operation actually selected by the user (i.e., other operation than the final operation) in the selection history database, so as to update the selection history database.

In response to the stop of the final operation, the context-based operation determination apparatus may perform a predefined operation. For example, the context-based operation determination apparatus may provide the user with an option to select one of a plurality of operations on the screen or by voice, or stop the process of recommendation and determination of the operation based on the context.

If the verification result is a different predefined value, e.g., 0, then the context-based operation determination apparatus may determine that the final operation is not appropriate (NO in 335), accordingly, the context-based operation determination apparatus performs an operation based on a different operation, e.g., a preset default operation (see step 350).

As described above, a context-based operation determination apparatus may include a vehicle. Accordingly, the above-described context-based operation determination method may be applied to a method for controlling the vehicle in the same way or through some modification. In this case, the context-based operation determination apparatus in each of the above-described step may be a vehicle and a recommended operation or final operation may be an operation that is able to be performed by the vehicle or at least one apparatus installed in the vehicle. For example, the recommended operation or the final operation may include an operation related to the operation of a navigation device installed in the vehicle, e.g., a destination search, a setting an/or guidance, related to a call origination or call reception using a paired terminal device using Bluetooth, related to on, off or temperature adjustment of an air conditioner, or related to change of channel or volume of a radio device or the like. In addition to these, various operations that a designer may consider are examples of the recommended operation or the final operations.

The method of determining an operation based on a context and the method of controlling a vehicle according to the above-described embodiments may be implemented in the form of a program that may be executed by various computer devices. Herein, the program may include a program command, a data file, and a data structure in a single or in combination. The program may be designed and manufactured using machine code or high-level language code. The program may be specially designed to implement the method of determining an operation based on a context and the method of controlling the vehicle described above, or may be designed using various functions and definitions that are well known and available to those having ordinary skill in the art.

A program for implementing a method for determining an operation based on a context and/or a control method of a vehicle may be recorded on a computer-readable recording medium. The computer-readable recording medium includes one or more types of hardware device, that is capable of storing a program that may be executed according to a call of a computer or the like, and for example, one or more types of hardware device may be a magnetic disk storage medium such as a hard disk or a floppy disk, a magnetic tape, an optical medium such as a compact disk (CD) or a digital versatile disk (DVD), a magneto-optical media such as a floptical disk or a semiconductor storage device such as a ROM, a RAM or a flash memory.

As is apparent from the above description, according to the context-based operation determination apparatus, the vehicle capable of determining an operation based on a context, the method of determining an operation based on the context and the method of controlling the vehicle, according to a user's input, it may be possible to provide a recommended operation that corresponds to the user' input.

As is apparent from the above description, according to the context-based operation determination apparatus, the vehicle capable of determining an operation based on a context, the method of determining an operation based on the context and the method of controlling the vehicle, it may be possible to reduce an unnecessary additional command input and conversation, thereby improving the quality of command recognition and operation recommendation.

As is apparent from the above description, according to the context-based operation determination apparatus, the vehicle capable of determining an operation based on a context, the method of determining an operation based on the context and the method of controlling the vehicle, it may be possible to reduce unnecessary processes even when the conversation scenario is changed according to the usage history of the user.

As is apparent from the above description, according to the context-based operation determination apparatus, the vehicle capable of determining an operation based on a context, the method of determining an operation based on the context and the method of controlling the vehicle, it may be possible to simplify the complicated process by omitting an unnecessary conversation, command input or processing steps, and thus the complexity of design and programming may be improved and a cost reduction may be achieved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A context-based operation determination apparatus, comprising:
   a context information obtainer configured to obtain context information;
   a context awareness database constructed using data related to a previously performed action;
   a processor configured to determine a recommendation index that corresponds to a recommended operation and the recommended operation using the context information, data obtained from the context awareness database, and a selection pattern, to verify the recommended operation, and to determine a final operation according to a result of verification; and a selection history database constructed using the final operation, the recommendation index, and an actual operation in a state where the final operation is presented, wherein the processor verifies the recommended operation using the selection history database, and wherein the processor further determines the selection pattern for each analysis criteria using the context information and the data obtained from the context awareness database and determines the recommended operation and the recommendation index using the selection pattern.

2. The context-based operation determination apparatus according to claim 1, wherein the context information includes a current time and a current position.

3. The context-based operation determination apparatus according to claim 1, wherein the processor further generates a first result value regarding at least one operation for each position, generates a second result value regarding at least one operation for each time, and generates a third result value regarding at least one operation for an entire operation so as to determine the selection pattern.

4. The context-based operation determination apparatus according to claim 3, wherein the processor further obtains an analysis result for at least one operation by performing a sum of the first result value, the second result value, and the third result value, or by performing a weighted sum of the first result value, the second result value, and the third result value.

5. The context-based operation determination apparatus according to claim 4, wherein the processor further determines the recommended operation and the recommendation index by comparing the analysis result for the at least one operation.

6. The context-based operation determination apparatus according to claim 1, wherein the processor further determines a plurality of weights using the selection history database and obtains a verification result value by performing the weighted sum of the recommended operation and the recommendation index based on the plurality of weights.

7. The context-based operation determination apparatus according to claim 6, wherein the processor further compares the verification result value with a reference value and determines the recommended operation as the final operation based on a result of the comparison.

8. The context-based operation determination apparatus according to claim 1, wherein the processor further generates a control signal that corresponds to the final operation in response to the determination of the final operation.

9. The context-based operation determination apparatus according to claim 1, further comprising:

a user interface configured to provide a user with a query about whether the final operation is approved.

10. The context-based operation determination apparatus according to claim 9, wherein the user interface further provides a user with a query about whether the final operation is approved after the final operation is generated.

11. The context-based operation determination apparatus according to claim 10, wherein the processor further maintains the final operation when the user interface receives a command of whether the final operation is approved, and stops the final operation when the user interface receives a command of whether the final operation is not approved.

12. The context-based operation determination apparatus according to claim 10, wherein the processor further updates the selection history database in response to receiving at least one of the commands of whether the final operation is approved and of whether the final operation is not approved.

13. The context-based operation determination apparatus according to claim 1, wherein the processor further generates a control signal to perform a predefined operation when the recommended operation is improper as a result of verification of the recommended operation.

14. A method of determining an operation based on a context, the method comprising:

obtaining context information;

obtaining data from a context awareness database constructed by data related to a previously performed action;

determining a recommendation index that corresponds to a recommended operation and the recommended operation based on the context information, data obtained from the context awareness database, and a selection pattern;

verifying the recommended operation; and determining a final operation based on a result of verification, wherein verifying the recommended operation comprises:

verifying the recommended operation using a selection history database constructed using the final operation, the recommendation index and an actual operation in a state where the final operation is presented, and wherein determining the recommendation index that corresponds to the recommended operation and the recommended operation based on the context information and data obtained from the context awareness database comprises:

determining the selection pattern for each analysis criteria using the context information and the data obtained from the context awareness database; and determining the recommended operation and the recommendation index using the selection pattern.

15. The method according to claim 14, wherein the context information includes a current time and a current position.

16. The method according to claim 14, wherein determining the selection pattern for each analysis criteria using the context information and the data obtained from the context awareness database comprises:

generating a first result value regarding at least one operation for each position;

generating a second result value regarding at least one operation for each time; and generating a third result value regarding at least one operation for an entire operation so as to determine the selection pattern.

17. The method according to claim 16, wherein determining the recommended operation and the recommendation index using the selection pattern comprises:

obtaining an analysis result for at least one operation by performing a sum of the first result value, the second result value, and the third result value; or obtaining an analysis result for at least one operation by performing a weighted sum of the first result value, the second result value, and the third result value.

18. The method according to claim 17, wherein determining the recommended operation and the recommendation index using the selection pattern comprises:

determining the recommended operation and the recommendation index by comparing the analysis result for the at least one operation.

19. The method according to claim 14, wherein verifying the recommended operation using the selection history database constructed using the final operation, the recommendation index, and an actual operation in a state where the final operation is presented comprises:
  determining a plurality of weights using the selection history database; and
  obtaining a verification result value by performing the weighted sum of the recommended operation and the recommendation index based on the plurality of weights.

20. The method according to claim 19, wherein verifying the recommended operation using the selection history database constructed using the final operation, the recommendation index, and an actual operation in a state where the final operation is presented comprises:
  comparing the verification result value with a reference value; and
  determining the recommended operation as the final operation based on a result of the comparison.

21. The method according to claim 14, further comprising:
  starting the final operation in response to the determination of the final operation.

22. The method according to claim 14, further comprising:
  providing a user with a query about whether the final operation is approved.

23. The method according to claim 22, further comprising at least one of:
  maintaining the final operation when the user interface receives a command of whether the final operation is approved; and
  stopping the final operation when the user interface receives a command of whether the final operation is not approved.

24. The method according to claim 23, further comprising:
  updating the selection history database in response to receiving at least one of the commands of whether the final operation is approved or whether the final operation is not approved.

25. The method according to claim 14, further comprising:
  performing a predefined operation when the recommended operation is improper as a result of verification of the recommended operation.

26. A vehicle comprising:
  a context information obtainer configured to obtain context information;
  a context awareness database constructed using data related to a previously performed action;
  a processor configured to determine a recommendation index that corresponds to a recommended operation and the recommended operation using the context information, data obtained from the context awareness database, and a selection pattern, to verify the recommended operation to determine a final operation according to a result of verification; and
  a selection history database constructed using the final operation, the recommendation index and an actual operation in a state where the final operation is presented,
  wherein the processor verifies the recommended operation using the selection history database, and
  wherein the processor further determines the selection pattern for each analysis criteria using the context information and the data obtained from the context awareness database and determines the recommended operation and the recommendation index using the selection pattern.

27. A method of controlling a vehicle, the method comprising:
  obtaining context information;
  obtaining data from a context awareness database constructed by data related to a previously performed action;
  determining a recommendation index that corresponds to a recommended operation and the recommended operation based on the context information, data obtained from the context awareness database, and a selection pattern;
  verifying the recommended operation; and
  determining a final operation based on a result of verification,
  wherein verifying the recommended operation comprises:
  verifying the recommended operation using a selection history database constructed using the final operation, the recommendation index, and an actual operation in a state where the final operation is presented, and
  wherein determining the recommendation index that corresponds to the recommended operation and the recommended operation based on the context information and data obtained from the context awareness database comprises:
  determining the selection pattern for each analysis criteria using the context information and the data obtained from the context awareness database; and
  determining the recommended operation and the recommendation index using the selection pattern.

* * * * *